United States Patent
Kawarada

(10) Patent No.: US 11,062,477 B2
(45) Date of Patent: Jul. 13, 2021

(54) IMAGE PROCESSING APPARATUS AND ITS CONTROL METHOD, IMAGING APPARATUS, IMAGE PROCESSING METHOD, AND STORAGE MEDIUM

(71) Applicant: CANON KABUSHIKI KAISHA, Tokyo (JP)

(72) Inventor: Masahiro Kawarada, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/385,815

(22) Filed: Apr. 16, 2019

(65) Prior Publication Data

US 2019/0325609 A1 Oct. 24, 2019

(30) Foreign Application Priority Data

Apr. 20, 2018 (JP) .............................. JP2018-081062
Apr. 11, 2019 (JP) .............................. JP2019-075241

(51) Int. Cl.
*H04N 5/232* (2006.01)
*G06T 7/80* (2017.01)
*G06T 7/00* (2017.01)

(52) U.S. Cl.
CPC .............. *G06T 7/80* (2017.01); *G06T 7/0002* (2013.01); *H04N 5/232122* (2018.08); *G06T 2207/10148* (2013.01); *G06T 2207/30168* (2013.01)

(58) Field of Classification Search
CPC .............................................. H04N 5/232122
USPC ....................................................... 348/349
See application file for complete search history.

(56) References Cited

U.S. PATENT DOCUMENTS

2016/0094781 A1* 3/2016 Ebato ..................... G02B 7/343
348/345
2016/0316158 A1* 10/2016 Uchida ............... H04N 5/23212

FOREIGN PATENT DOCUMENTS

JP 2004-320487 A 11/2004

OTHER PUBLICATIONS

Extensible Metadata Platform (XMP) Specification Part 1 Data Model, Serialization, and Core Properties, Adobe Systems Incorporated, Apr. 2012 (52 pgs) Cited in Specification in paragraphs [0063][0065][0094][0119][0168].
Extensible Metadata Platform (XMP) Specification Part 2 Additional Properties, Adobe Systems Incorporated, Apr. 2012 (40 pgs) Cited in Specification in paragraphs [0063][0065][0094][0119][0168].

(Continued)

*Primary Examiner* — Joel W Fosselman
(74) *Attorney, Agent, or Firm* — Cowan, Liebowitz & Latman, P.C.

(57) ABSTRACT

An image processing apparatus includes a first evaluator configured to evaluate under a first evaluation condition a focus state of each of a plurality of image data acquired by consecutive capturing, a second evaluator configured to evaluate the focus state of each of the plurality of image data under a second evaluation condition different from the first evaluation condition, and a recorder configured to record first evaluation information indicating an evaluation result under the first evaluation condition and second evaluation information indicating an evaluation result under the second evaluation condition.

16 Claims, 22 Drawing Sheets

(56) References Cited

OTHER PUBLICATIONS

Extensible Metadata Platform (XMP) Specification Part 3 Storage in Files, Adobe Systems Incorporated, Apr. 2012 (40 pgs) Cited in Specification in paragraphs [0063][0065][0094][0119][0168].
General Incorporated Association, Camera & Imaging Products Association, CIPA DC-008-Translation-2016 (191 pgs) Exchangeable image file format for digital still cameras: Exif Version 2.31 (Revised Jul. 2016) Cited in Specification in paragraph [0062][0065].

* cited by examiner

| IN-FOCUS LEVEL J [Fδ] | J≤0.25 | J≤0.50 | J≤0.75 | J≤1.00 | J≤1.25 | J≤1.50 | J≤1.75 | J≤2.00 | 2.00<J |
|---|---|---|---|---|---|---|---|---|---|
| ABSOLUTE VALUE OF DEFOCUS AMOUNT D [μm] (F2.8, δ=10μm) | D≤7 | D≤14 | D≤21 | D≤28 | D≤35 | D≤42 | D≤49 | D≤56 | 56<D |
| PRIMARY RATING | 9 | 8 | 7 | 6 | 5 | 4 | 3 | 2 | 1 |

FIG. 10

| IN-FOCUS LEVEL J [Fδ] | | ≤0.25 | ≤0.50 | ≤0.75 | ≤1.00 | ≤1.25 | ≤1.50 | ≤1.75 | ≤2.00 | 2.00< |
|---|---|---|---|---|---|---|---|---|---|---|
| REPRESENTATIVE VALUE | | 0.125 | 0.375 | 0.625 | 0.875 | 1.125 | 1.375 | 1.625 | | |
| PRIMARY RATING | | 9 | 8 | 7 | 6 | 5 | 4 | 3 | 2 | 1 |
| DISTRIBUTION NUMBER OF PRIMARY RATINGS | | 2 | 4 | 1 | 2 | 1 | 0 | 1 | 0 | 0 |
| SECONDARY RATING | BASED ON CENTER VALUE | | 5 | 4 | 3 | 2 | 1 | | | |
| | BASED ON CENTER OF GRAVITY VALUE | 5 | 4 | 3 | 2 | 1 | | | | |
| DISTRIBUTION NUMBER OF SECONDARY RATINGS | BASED ON CENTER VALUE | | 6 | 1 | 2 | 1 | 1 | | | |
| | BASED ON CENTER OF GRAVITY VALUE | 2 | 4 | 1 | 2 | 2 | | | | |

| IN-FOCUS LEVEL J [Fδ] | ≤0.25 | ≤0.50 | ≤0.75 | ≤1.00 | ≤1.25 | ≤1.50 | ≤1.75 | ≤2.00 | 2.00< |
|---|---|---|---|---|---|---|---|---|---|
| REPRESENTATIVE VALUE | 0.125 | 0.375 | 0.625 | 0.875 | 1.125 | 1.375 | 1.625 | 1.875 | |
| PRIMARY RATING | 9 | 8 | 7 | 6 | 5 | 4 | 3 | 2 | 1 |
| DISTRIBUTION NUMBER OF PRIMARY RATINGS | 2 | 4 | 1 | 2 | 1 | 0 | 1 | 0 | 0 |
| SECONDARY RATING / FOCUS DETECTION RELIABILITY=10 | 5 | 4 | 3 | 2 | 1 | | | | |
| SECONDARY RATING / FOCUS DETECTION RELIABILITY=9 | | 5 | 4 | 3 | 2 | 1 | | | |
| SECONDARY RATING / FOCUS DETECTION RELIABILITY=8 | | | 5 | 4 | 3 | 2 | 1 | | |
| SECONDARY RATING / FOCUS DETECTION RELIABILITY≤7 | | | | 5 | 4 | 3 | 2 | 1 | |
| DISTRIBUTION NUMBER OF SECONDARY RATINGS / FOCUS DETECTION RELIABILITY=10 | 2 | 4 | 1 | 2 | 2 | 1 | 1 | | |
| DISTRIBUTION NUMBER OF SECONDARY RATINGS / FOCUS DETECTION RELIABILITY=9 | | 6 | 1 | 2 | 1 | 0 | | 0 | |
| DISTRIBUTION NUMBER OF SECONDARY RATINGS / FOCUS DETECTION RELIABILITY=8 | | | 7 | 2 | 1 | 0 | 1 | | |
| DISTRIBUTION NUMBER OF SECONDARY RATINGS / FOCUS DETECTION RELIABILITY≤7 | | | | 9 | 1 | 0 | 1 | 0 | |

FIG. 17

| IN-FOCUS LEVEL J [Fδ] | | ≤0.25 | ≤0.50 | ≤0.75 | ≤1.00 | ≤1.25 | ≤1.50 | ≤1.75 | ≤2.00 | 2.00< |
|---|---|---|---|---|---|---|---|---|---|---|
| DISTRIBUTION NUMBER OF TARGETS | NARROW RANGE MODE | 2 | 3 | 1 | 2 | 1 | 0 | 1 | 0 | 1 |
| | WIDE RANGE MODE | 5 | 4 | 3 | 2 | 1 | | | | |
| SECONDARY RATING | NARROW RANGE MODE | | | | 5 | 4 | 3 | 2 | 1 | |
| DISTRIBUTION NUMBER OF SECONDARY RATINGS | WIDE RANGE MODE | 2 | 3 | 1 | 2 | 3 | 0 | 1 | 1 | |
| | | | | | 8 | | | | | |

IMAGE PROCESSING APPARATUS AND ITS CONTROL METHOD, IMAGING APPARATUS, IMAGE PROCESSING METHOD, AND STORAGE MEDIUM

BACKGROUND OF THE INVENTION

Field of the Invention

The present invention relates to a technology to automatically classify image data captured through imaging (image capturing), based on a focus detection result.

Description of the Related Art

A method of classifying and recording a plurality of images acquired by imaging based on the sharpness has been proposed. Japanese Patent Laid-Open No. ("JP") 2004-320487 discloses an imaging apparatus that consecutively captures a plurality of still images with a fixed focus position, automatically selects and records one still image having the highest AF (autofocus) evaluation value corresponding to a high frequency component among the obtained plurality of still images, in a recording area for storage. This imaging apparatus records an unselected still image in a recording area for deletion use.

The imaging apparatus disclosed in JP 2004-320487 preferentially records in-focus still images among a plurality of still images obtained by consecutive capturing, and it is unnecessary for the user to select a still image having a good focus state from the plurality of still images. Nevertheless, this imaging apparatus may not select a still image intended by the user. Since the imaging apparatus provides consecutive capturing at the fixed focus position, it is estimated that the captured still image with the highest AF evaluation value has the best focus state. However, the highest AF evaluation value means the relatively higher focus state among the plurality of still images acquired by the imaging, and does not mean that the object intended by the user is always focused.

In consecutively capturing an object moving in a depth direction with a focus position changed, an object image magnification varies as the object distance (imaging distance) varies because the object distance depends on the focus position. As the object image magnification varies, the spatial frequency characteristic of the object varies and the image composition itself also varies, so the level of the AF evaluation value of the still image fluctuates and the focus states cannot be compared with each other simply based on the AF evaluation value.

SUMMARY OF THE INVENTION

The present invention provides an image processing technology which can properly evaluate focus states of a plurality of image data acquired by consecutive capturing.

An image processing apparatus according to one aspect of the present invention includes a first evaluator configured to evaluate under a first evaluation condition a focus state of each of a plurality of image data acquired by consecutive capturing, a second evaluator configured to evaluate the focus state of each of the plurality of image data under a second evaluation condition different from the first evaluation condition, and a recorder configured to record first evaluation information indicating an evaluation result under the first evaluation condition and second evaluation information indicating an evaluation result under the second evaluation condition.

An imaging apparatus according to another aspect of the present invention includes an image sensor configured to provide continuous capturing, and the above image processing apparatus. An image processing method corresponding to the above image processing apparatus and a storage medium storing the image processing method also constitute another aspect of the present invention.

An image processing apparatus according to another aspect of the present invention includes a focus detector configured to acquire a focus detection result based on image data, an evaluator configured to provide one of a plurality of ratings including at least a primary rating, a secondary rating, and a third rating to the image data based on the focus detection result, and a determiner configured to determine a correlation between each of the plurality of ratings and a range of the focus detection result. A smaller value of the focus detection result is closer to in-focus. The determiner has a first mode that correlates the range of the focus detection result with the primary rating when the focus detection result is smaller than a first threshold and correlates the range of the focus detection result with a rating other than the primary rating when the focus detection result is equal to or larger than the first threshold, and a second mode that correlates the range of the first detection result with the primary rating when the first detection result is equal to or larger than the first threshold but smaller than a second threshold that is larger than the first threshold, and correlates the range of the focus detection result with the rating other than the primary rating when the focus detection result is equal to or larger than the second threshold. A control method of this image processing method also constitutes another aspect of the present invention.

Further features of the present invention will become apparent from the following description of exemplary embodiments with reference to the attached drawings.

BRIEF DESCRIPTION OF THE DRAWINGS

FIG. 10 illustrates a relationship between an absolute value of a defocus amount and a rating in the primary rating processing according to the first embodiment.

FIG. 17 illustrates an example of moving a segment range of an in-focus level of interest by the secondary rating in accordance with a focus detection reliability in the third embodiment.

DESCRIPTION OF THE EMBODIMENTS

Referring now to the accompanying drawings, a detailed description will be given of a variety of embodiments according to the present invention.

First Embodiment

<Configuration of Digital Camera>

Figure 1:
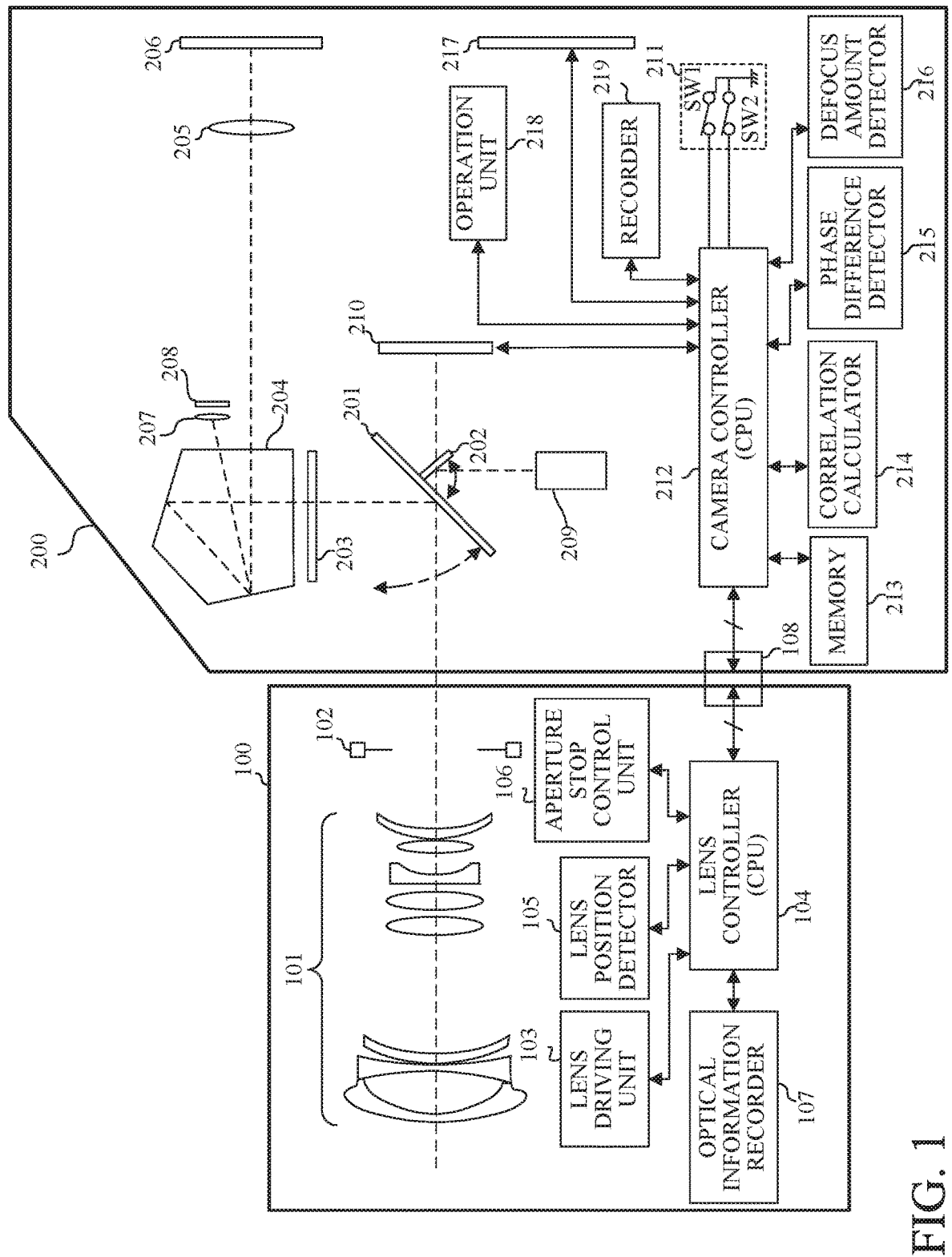
FIG. 1 illustrates a configuration of a digital camera according to a first embodiment of the present invention.

FIG. 1 illustrates a configuration of a digital camera as an imaging apparatus according to a first embodiment of the present invention. The digital camera includes a lens unit portion 100 and a camera portion 200. The lens unit portion 100 is detachably attached to the camera portion 200 via a lens mount mechanism provided on an unillustrated mount unit. An electric contact unit 108 is provided in the mount portion. The electrical contact unit 108 includes a communication bus line terminal including a communication clock line, a data transmitting line, a data receiving line, and the like, and the lens unit portion 100 and the camera portion 200 are communicatively connected by the communication bus line terminal.

The lens unit portion 100 includes an imaging optical system. The imaging optical system includes a lens portion 101 including a zoom lens and a focus lens that move in the optical axis direction for zooming (magnification variation) and focusing, and an aperture stop (diaphragm) 102 that controls a light amount. The lens unit portion 100 further includes a driving system using, as a driving source, a stepping motor configured to move the zoom lens and the focus lens, and a lens driving unit 103 including an electric circuit configured to drive the driving source. The lens unit portion 100 includes a lens position detector 105 that obtains a signal waveform indicating a phase of the stepping motor in the lens driving unit 103 through a lens controller 104, and detects the positions of the zoom lens and the focus lens. The lens portion 101, the lens driving unit 103, and the lens position detector 105 constitute a focusing unit.

The lens unit portion 100 further includes an aperture stop control unit 106 configured to control the aperture stop 102, and an optical information recorder 107 configured to record a variety of optical design values of the lens portion 101 and the aperture stop 102. The lens driving unit 103, the aperture stop control unit 106, and the optical information recorder 107 are connected to a lens controller 104, such as a CPU, that controls the entire operation of the lens unit portion 100.

The camera portion 200 communicates with the lens unit portion 100 via the electrical contact unit 108, transmits zoom and focus control requests of the lens portion 101 and a control request of the aperture stop 102 to the lens unit portion 100, and receives the control result from the lens unit portion 100.

A light flux entering the imaging optical system passes through the lens portion 101 and the aperture stop 102 and is guided to a main mirror 201 in the camera portion 200. The main mirror 201 includes a half-mirror, and when it is obliquely disposed on the optical path from the imaging optical system (while this state will be referred to as a mirror-down state hereinafter) as illustrated in FIG. 1, focuses half the incident light flux on a focus plate 203 and transmits the other half toward a sub mirror 202. The main mirror 201 can move upwardly as indicated by a double-headed arrow in FIG. 1 to retreat from the optical path (while this state will be referred to as mirror-up state hereinafter). The sub mirror 202 also moves to the mirror-up state as indicated by the double-headed arrow in the figure and retreats to the outside of the optical path.

The focus plate 203 is a diffusing plate disposed at a position optically conjugate with an image capturer 210, which will be described later, and a light beam from the imaging optical system forms an object image on the focus plate 203. The light flux (object image) that has transmitted through the focus plate 203 is converted into an erect image by a pentaprism 204, passes through an eyepiece 205, and reaches a viewfinder 206. The user can observe the object image formed on the focus plate 203 through the viewfinder 206 and the eyepiece 205.

Part of the light beam entering the pentaprism 204 passes through a photometric imaging lens 207 and enters a photometric sensor 208 that measures the luminance of the object image. The photometric sensor 208 includes an unillustrated photoelectric conversion element and an unillustrated processor that calculates the luminance from the electric charges obtained by the photoelectric conversion element. The photometric sensor 208 obtains two-dimensional monochromatic multi-gradation image data from the electric charges obtained from the photoelectric conversion element. This monochromatic multi-gradation image data is stored in a memory 213 for later reference by various modules.

In the mirror-down state, the sub mirror 202 guides the reflected light flux to the focus detecting unit 209. The focus detecting unit 209 performs a focus detection in the focus detecting area by the phase difference detection method. The focus detecting area is a single area, such as a center portion of the imaging angle of view.

On the other hand, in the mirror-up state, the light flux entering the imaging optical system passes through the lens portion 101 and the aperture stop 102 and reaches the image capturer 210 in the camera portion 200. The image capturer 210 includes an image sensor as a two-dimensional photo-electric conversion element, and a processor that generates image data from the image signal output from the image sensor and performs various image processing, such as a luminance correction, for the imaging data. The detailed configuration of the image capturer 210 will be described later.

The camera portion 200 includes an operation switch 211 to be operated by the user. The operation switch 211 is a two-step stroke type switch, and an imaging preparation operation such as the photometry and focusing is started in the mirror-down state by the ON operation of (or by turning on) the first stage (SW1). The main mirror 201 and the sub mirror 202 are moved to the mirror-up state by the ON operation of (or by turning on) the second stage (SW2), and the imaging operation starts. When the ON operation of the SW2 continues in a still-image consecutive-capturing mode described later, consecutive capturing including a plurality of imaging operations is performed.

A correlation calculator 214 performs a correlation operation for a pair of phase difference image signals (two image signals) obtained from the focus detecting unit 209 or the image capturer 210 to calculate a correlation value for each shift amount between the two image signals. The phase difference detector 215 calculates a shift amount indicating a correlation with the highest calculated correlation value or a phase difference (image shift amount). The defocus amount detector 216 calculates a defocus amount of the imaging optical system based on the phase difference calculated by the phase difference detector 215 and the optical characteristic of the imaging optical system.

A camera controller 212 transmits and receives control information to and from the lens controller 104 via the electric contact unit 108, and drives and controls the lens portion 101 based on the defocus amount calculated by the defocus amount detector 216. Thereby, the focus position of the imaging optical system is controlled (or AF is performed).

The digital camera according to this embodiment has a display unit 217 for displaying the object image captured by the image capturer 210 and a variety of operation statuses. The digital camera has a still-image single-capturing mode, a still-image consecutive-capturing mode, a live-view mode, and a motion image recording mode, as imaging operation modes, and possesses the operation unit 218 to be operated by the user in switching the imaging operation mode. The operation unit 218 can also input an instruction to start or end motion image recording. The digital camera has a focus detection mode including a single-capturing AF mode and a servo AF mode, which will be described later, and the user can select the focus detection mode through the operation unit 218.

<Image Capturer 210>

Figure 2:
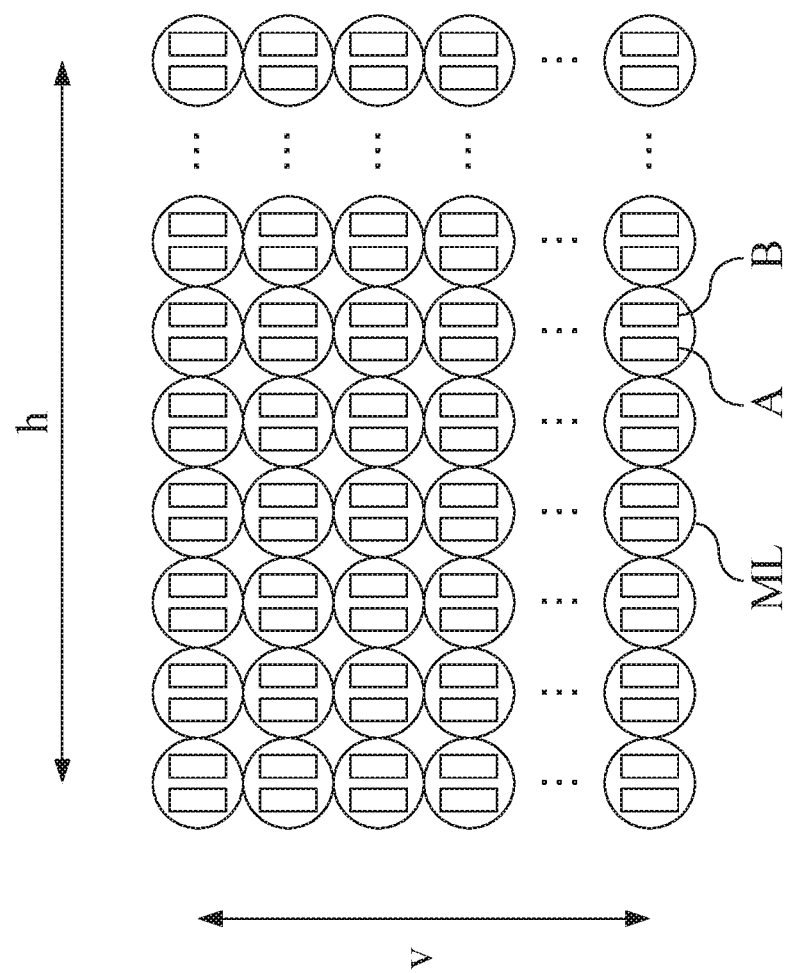
FIG. 2 illustrates an imaging plane in the digital camera according to the first embodiment viewed from a light incidence side.
Figure 3A:
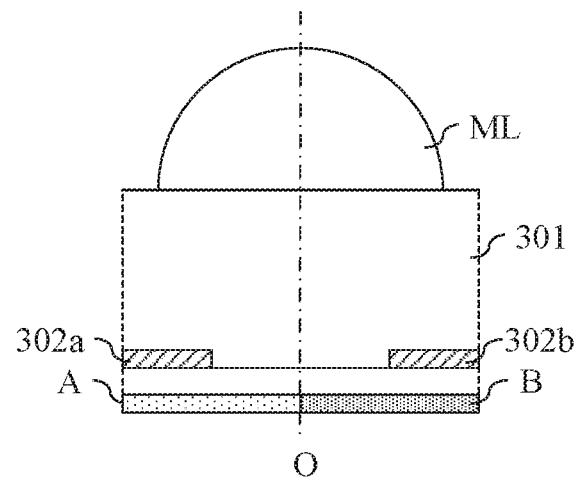
FIGS. 3A and 3B illustrate a configuration of a pixel portion on the imaging plane according to the first embodiment.
Figure 3B:
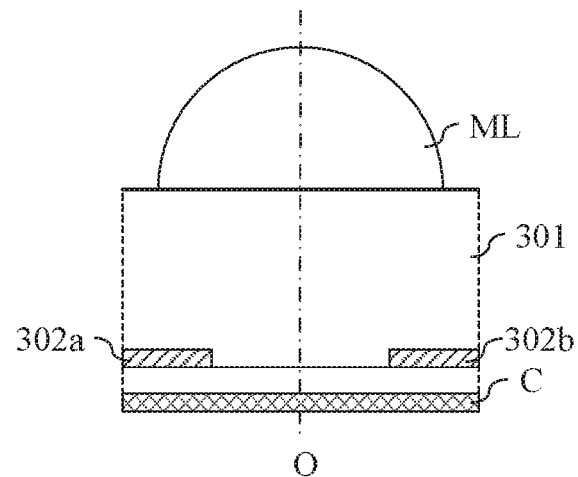

Referring now to FIGS. 2, 3A, and 3B, a description will be given of the configuration of the imaging plane of the image sensor in the image capturer (imaging portion or unit) 210. FIG. 2 illustrates an imaging plane viewed from the light incident side. The image capturer 210 has a plurality of pixel units (h pixel portions in the horizontal direction x v pixel portions in the vertical direction).

FIG. 3A illustrates the configuration of one pixel portion. Each pixel portion has a first focus detecting pixel A and a second focus detecting pixel B which a pair of light beams divided on the exit pupil plane in the imaging optical system enter, respectively. A single micro lens ML as a condenser is disposed in front of the first focus detecting pixel A and the second focus detecting pixel B. Each pixel portion has a color filter (not illustrated) of red, green, and blue in the Bayer array.

In the pixel portion, a smooth layer 301 is a plane for forming the micro lens ML. Light shielding layers 302a and 302b are arranged to prevent unnecessary light beams at oblique angles from entering the first focus detecting pixel A and the second focus detecting pixel B. The first focus detecting pixel A and the second focus detecting pixel B respectively receive, with a parallax, light beams from mutually different pupil regions on the exit pupil in the imaging optical system, which are symmetrical with respect to a center O in the pixel portion, and output electric charges (pixel signals). When the charges (image signal) for an imaging pixel C can be obtained by adding the charges of the first focus detecting pixel A and the charges of the second focus detecting pixel B to each other, as illustrated in FIG. 3B.

<Principle of Focus Detection by Imaging-Plane Phase Difference Detection Method>

A first focus detecting pixel array in which a plurality of first focus detecting pixels A are arranged and a second focus detecting pixel array in which a plurality of second focus detecting pixels B are arranged form a mutual pair in the image sensor. As the number of pixels in the image sensor increases, a pair of approximated object images (two images) are formed on the pair of first and second focus detecting pixel arrays. A row of phase difference image signals (referred to as an A image signal hereinafter) is generated by combining the pixel signals from the plurality of first focus detecting pixels A in the first focus detecting pixel row. A row of phase difference image signals (referred to as a B image signal hereinafter) is generated by combining the pixel signals from the plurality of second focus detecting pixels B in the second focus detecting pixel row. In the in-focus state in which the imaging optical system is focused on the object, the A image signal and the B image signal coincide with each other.

On the other hand, in the defocus state where the imaging optical system is defocused from the object, there is a phase difference between the A image signal and the B image signal. The phase difference direction is opposite between the front focus state in which the imaging position is located on the front side of the expected focal plane and the rear focus state in which the imaging position is located on the far side of the expected focal plane.

Figure 4:
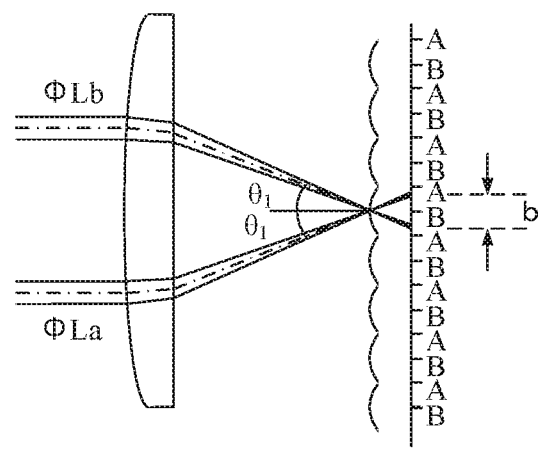
FIG. 4 illustrates a phase difference of a phase difference image signal obtained from focus detecting pixels in an in-focus state according to the first embodiment.
Figure 5:
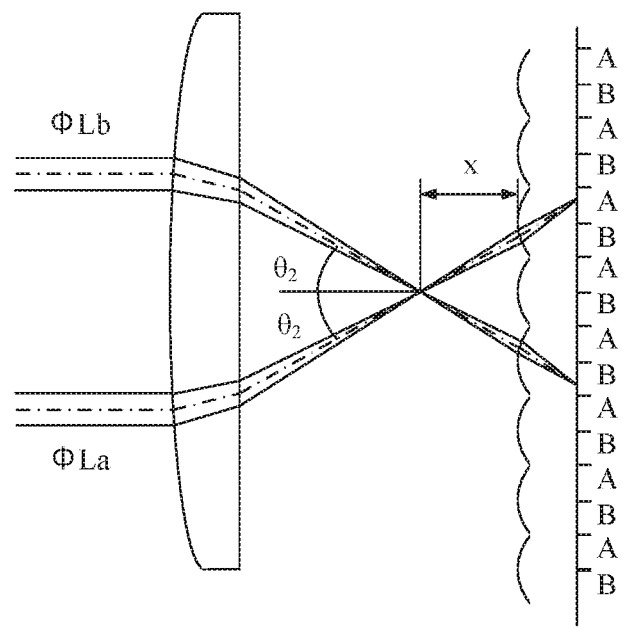
FIG. 5 illustrates the phase difference of the phase difference image signal obtained from the focus detecting pixels in a defocus state according to the first embodiment.

FIG. 4 illustrates the phase difference between the A image signal and the B image signal in the in-focus state in a certain pixel portion. FIG. 5 illustrates the phase difference between the A image signal and the B image signal in a defocus state in the certain pixel portion. In FIGS. 4 and 5, the first focus detecting pixel A is expressed by A and the second focus detecting pixel B is expressed by B.

The light flux from the object (one point) is divided into a light flux φLa entering the first focus detecting pixel A through the pupil region corresponding to the first focus detecting pixel A and a light flux ΦLb entering the second focus detecting pixel B through the pupil region corresponding to the second focus detecting pixel B. Since these two light fluxes are incident from the same point on the object, the two light beams enter the same micro lens ML at an incident angle $θ_1$, pass through it, and reach one point on the image sensor in the in-focus state of the imaging optical system, as illustrated in FIG. 4. Hence, the A image signal and the B image signal coincide with each other.

On the other hand, as illustrated in FIG. 5, in a defocus state with x, the arrival positions of the two light fluxes ΦLa and ΦLb shift from each other by an amount corresponding to incident angles of the light fluxes ΦLa and ΦLb on the micro lens ML changing from $θ_1$ to $θ_2$. Thus, there is a phase difference between the A image signal and the B image signal. Then, the focus detection by the imaging-plane phase difference detection method calculates the phase difference through the correlation calculation to the A image signal and the B image signal, and the defocus amount based on the phase difference.

<Focus Detecting Unit 209>

Figure 6:
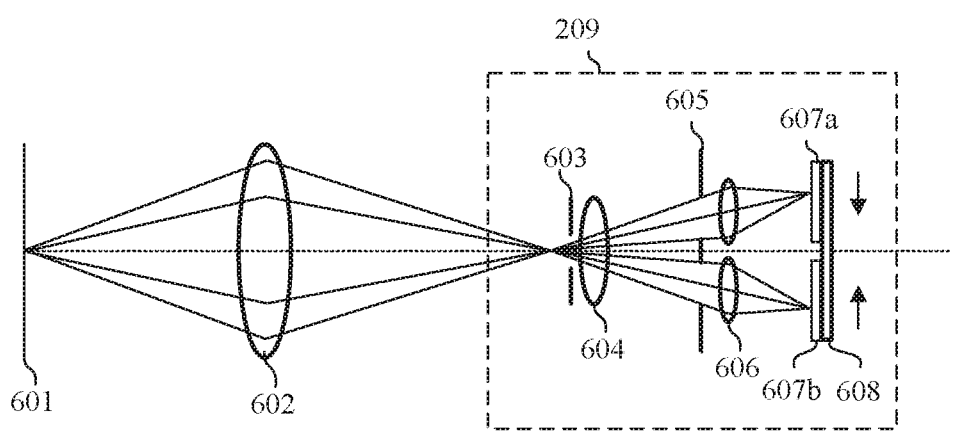
FIG. 6 illustrates an optical system in a focus detecting unit in FIG. 1.

Referring now to FIG. 6, a description will be given of an optical system in the focus detecting unit 209. In FIG. 6, the light flux emitted from an object plane 601 passes through an imaging optical system 602 including the lens portion 101 and the aperture stop 102, and the main mirror 201, is reflected by the sub mirror 202, and enters the focus detecting unit 209. The focus detecting unit 209 includes a field mask 603, a field lens 604, a secondary optical system aperture stop 605, secondary imaging lenses 606, and a focus detecting sensor 608 including at least a pair of photoelectric conversion element arrays 607a and 607b.

The light flux entering the focus detecting unit 209 passes through the field mask 603 disposed near the expected imaging plane and enters the field lens 604. The field mask 603 is a light shielding member for preventing unnecessary light flux outside the focus detecting area from entering the photoelectric conversion element arrays 607a and 607b from the field lens 604. The field lens 604 controls the light flux from the imaging optical system 602 in order to suppress dimming and unsharpness of the peripheral portion in the focus detecting area. The light flux having passed through the field lens 604 further passes through the pair of secondary optical system aperture stops 605 and the secondary imaging lenses 606 arranged symmetrically with respect to the optical axis in the imaging optical system 602. Thereby, one part (one of the pair) of light beams passing through the imaging optical system 602 enters the photoelectric conversion element array 607a and the other part (the other pair of) light beams enters the photoelectric conversion element array 607b.

<Principle of Focus Detection based on Signal from Focus Detecting Unit 209>

When the imaging plane of the imaging optical system 602 is located on the front side of the expected imaging plane, the light flux entering the photoelectric conversion element array 607a and the light flux entering the photoelectric conversion element array 607b approach to each other in the direction indicated by arrows in FIG. 6. When the imaging plane of the imaging optical system 602 is behind the expected imaging plane, the light flux entering the photoelectric conversion element array 607a and the light flux entering the photoelectric conversion element array 607b are separated from each other. Thus, a shift amount between the light beam entering the photoelectric conversion element array 607a and the light beam entering the photoelectric conversion element array 607b has a correlation with the in-focus level of the imaging optical system 602. Once the phase difference is calculated between the signal (A image signal) obtained by photoelectrically converting the light beam entering the photoelectric conversion element array 607a and the signal (B image signal) obtained by photoelectrically converting the light beam entering the photoelectric conversion element array 607b, the defocus amount can be calculated from the phase difference. Thereby, the focus detection using the phase difference detection method can be performed.

<Recording Method of Attribute Information in Image Data>

Figure 7:
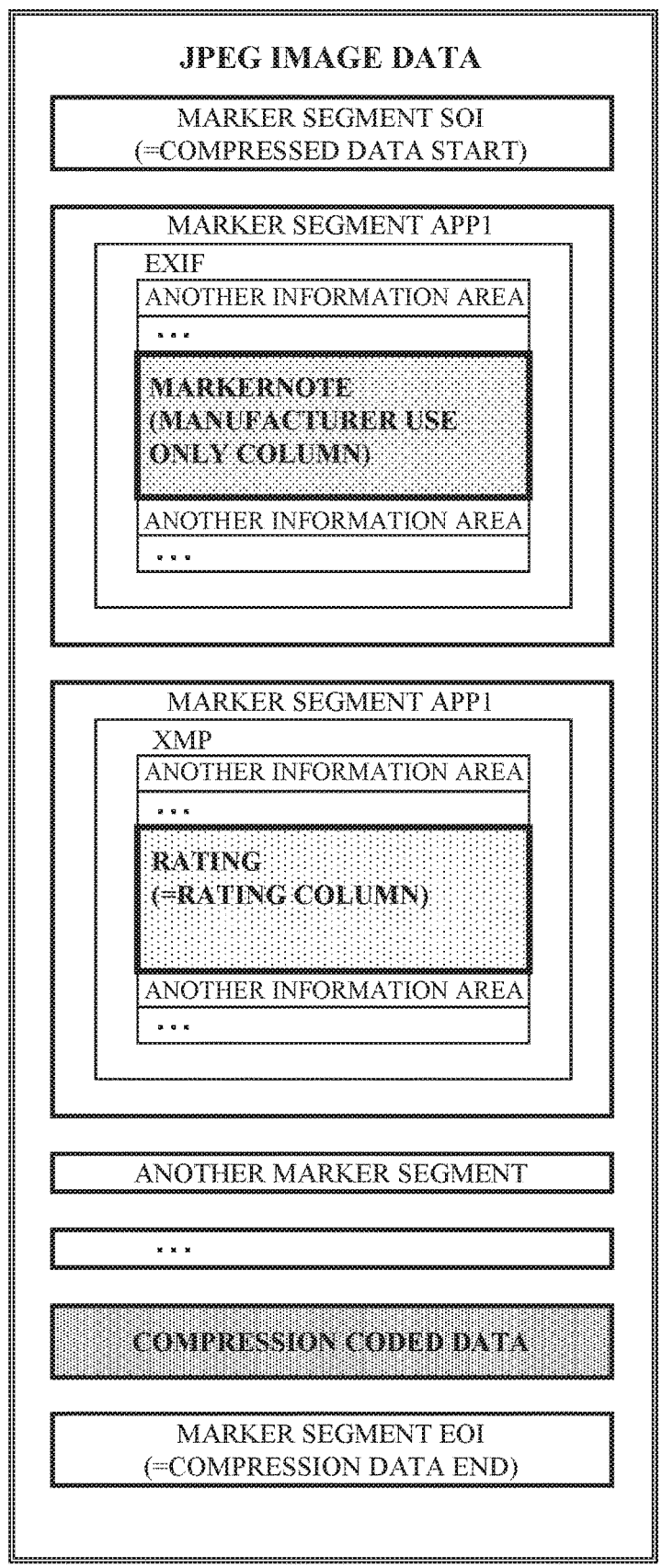
FIG. 7 illustrates an illustrative structure of JPEG image data.

FIG. 7 illustrates an illustrative structure of image data in storing image data obtained by imaging by the JPEG format. The content of the data string in the image data of the JPEG format can be recognized by segmenting the data string of various information with marker segments represented by the byte string. As illustrated in FIG. 7, a marker segment "SOI" indicating a start of compressed data is described as a header of the image data in the JPEG format, and a marker segment "APP1" indicating the attribute information in the image data is described next. In addition, various information such as a quantization table and a Huffman table of the compressed image data and marker segments different from "APP1" are described. Finally, the data string of the compressed and coded image and the marker segment "EOI" indicating an end of the compressed data are described.

The marker segment "APP1" indicating the attribute information of the image data can describe the "MakerNote" (manufacturer use only) field and other attribute information by the Exif format described in General Incorporated Association. Camera & imaging Products Association, Exchangeable image file format for digital still cameras: Exif Version 2.31 (CIPA DC-008-2016) ("Literature 1"). The "MakerNote" field can freely describe various information as long as the manufacturer keeps the image file format standard. Despite the description freedom degree, it has a characteristic in low compatibility with other manufacturers: This recording system corresponds to a first recording method.

The marker segment "APP1" can describe a "Rating" field and other attribute information by the XMP format (Adobe XMP standard) described in "Extensible Metadata. Platform (XMP) Specification" Part 1 to Part 3, Adobe Systems Incorporated ("Literature 2"). The "Rating" field can describe totally seven ratings (evaluation results) of 0 to 5 as standard values and −1 as an explicitly non-rated value. This rating enables partial images with high ratings from images including, for example, a large number of captured images to be extracted and preferentially treated. The description mode and the number of ratings in the "Rating" field are predetermined with small freedom degrees but provide high compatibility with other manufacturers. This recording system corresponds to a second recording method. The first recording method has ratings (evaluation stages) than those of the second recording method.

The marker segment "APP1" can use the description of the Exif format and the description of the XMP format together, and in this case, the same marker segment "APP1" is provided for each description format individually. The recording mode of segmenting the data strings of various information with such marker segments is also used in TIFF and other image file formats in addition to the JPEG format.

In selecting the image data according to a predetermined selection criterion, information can be highly compatibly communicated with devices made of other manufacturers by recording the selection result according to the existing standard, as disclosed in Literature 2, but the limited number of selections is problematic. One method uses, as disclosed in Literature 1, the manufacturer's own recording area to increase the number of selections, but the low compatibility becomes problematic in communicating information with the devices made by the other manufacturer. The small selection number may cause a biasing selection result depending on the setting of the selection index.

<Imaging Operation Modes of Digital Camera>

The digital camera according to this embodiment has a still-image single-capturing mode and a still-image consecutive-capturing mode, which are different in operations from imaging to recording. Each mode will be described below.

<Still-Image Single-Capturing Mode>

The still-image single-capturing mode in this embodiment is a mode that provides a single still image in response to the ON operation of the SW2 in the operation switch 211. In the still-image single-capturing mode, the camera controller 212 controls the main mirror 201 to provide the mirror-down state and to enable the user to visually confirm the object image through the viewfinder 206. The light flux from the object is guided to the focus detecting unit 209 by the sub mirror 202.

In response to the ON operation of the SW1 in the operation switch 211 in the still-image single-capturing mode, a first photometry (light metering) operation measures the luminance of the object image with the photometric sensor 208, and determines the aperture diameter of the aperture stop 102 and the charge accumulation time and the ISO speed of the image capturer 210 based on the photometric result. Following the first photometry operation, the first focus detection is performed by the focus detecting unit 209, and the focus position of the lens portion 101 is controlled based on the obtained focus detection result (first focus detection result).

In response to the ON operation of the SW2 in the still-image single-capturing mode, the aperture stop 102 is controlled to the aperture diameter determined based on the photometry result of the first photometry operation. At the same time, the main mirror 201 and the sub mirror 202 are moved to the mirror-up state. In the mirror-up state, an imaging operation is performed in which the image capturer 210 acquires the image signal with the charge accumulation time and the ISO speed determined by the photometric result of the first photometry operation.

The image capturer 210 generates first RAW data as pupil division image data from the image signal obtained by photoelectrically converting the object image formed by the imaging optical system. The first RAW data is obtained by photoelectrically converting each of a pair of object light fluxes divided on the exit pupil plane, and serves as image data including the signal corresponding to the first focus detecting pixel A and the signal corresponding to the second focus detecting pixel B (or a pair of pixel signals) in each pixel portion. The first RAW data is temporarily stored in the memory 213 connected to the camera controller 212.

The first RAW data temporarily stored in the memory 213 is sent to the correlation calculator 214 connected to the camera controller 212 and used for a second focus detection based on the first RAW data.

The camera controller 212 converts the first RAW data into a file format for a RAW file for recording and generates the second RAW data for recording. The second RAW data corresponds to the first RAW data (pupil division image data), and records an imaging condition (such as an F-number (or aperture value)) and attribute information. The second RAW data is recorded in the recorder 219.

The camera controller 212 adds the A image signal and the B image signal included in the second RAW data to each other for each pixel portion, generates the image signal, and performs image processing, such as a development computation, for the image signal. This image processing provides the still image data for recording in a predetermined file format (MEG file in this embodiment), which is <Still-Image Consecutive-Capturing Mode>

The still-image consecutive-capturing mode in this embodiment is a mode that repeatedly captures still images as long as the ON operation of the SW2 of the operation switch 211 continues and until the SW2 is turned off. Thereby, a plurality of still images are acquired.

<AF Mode>

The digital camera according to this embodiment has a single-capturing AF mode and a servo AF mode for the focus detecting modes. A description will now be given of these focus detecting modes.

The single-capturing AF mode is one focus detecting mode that provides a focus position control (referred to as a focus position control hereinafter) for obtaining the in-focus state only once in response to the ON operation of the SW1 in the operation switch 211. After the focus position control is completed, the focus position is fixed as it is while the ON state of the SW1 continues. In this embodiment, the camera controller 212 controls the focus position in the single-capturing AF mode during the still-image single-capturing mode.

The servo AF mode is another focus detection mode that repeatedly provides the focus position controls while the ON operation of the SW1 in the operation switch 211 continues. Thereby, the focus position can follow the moving object. The focus position control ends in response to the release of the ON operation of SW1 or the ON operation of the SW2. In this embodiment, the camera controller 212 performs the focus position control in the servo AF mode during the still-image consecutive-capturing mode.

<Operation of Digital Camera>

Figure 8:
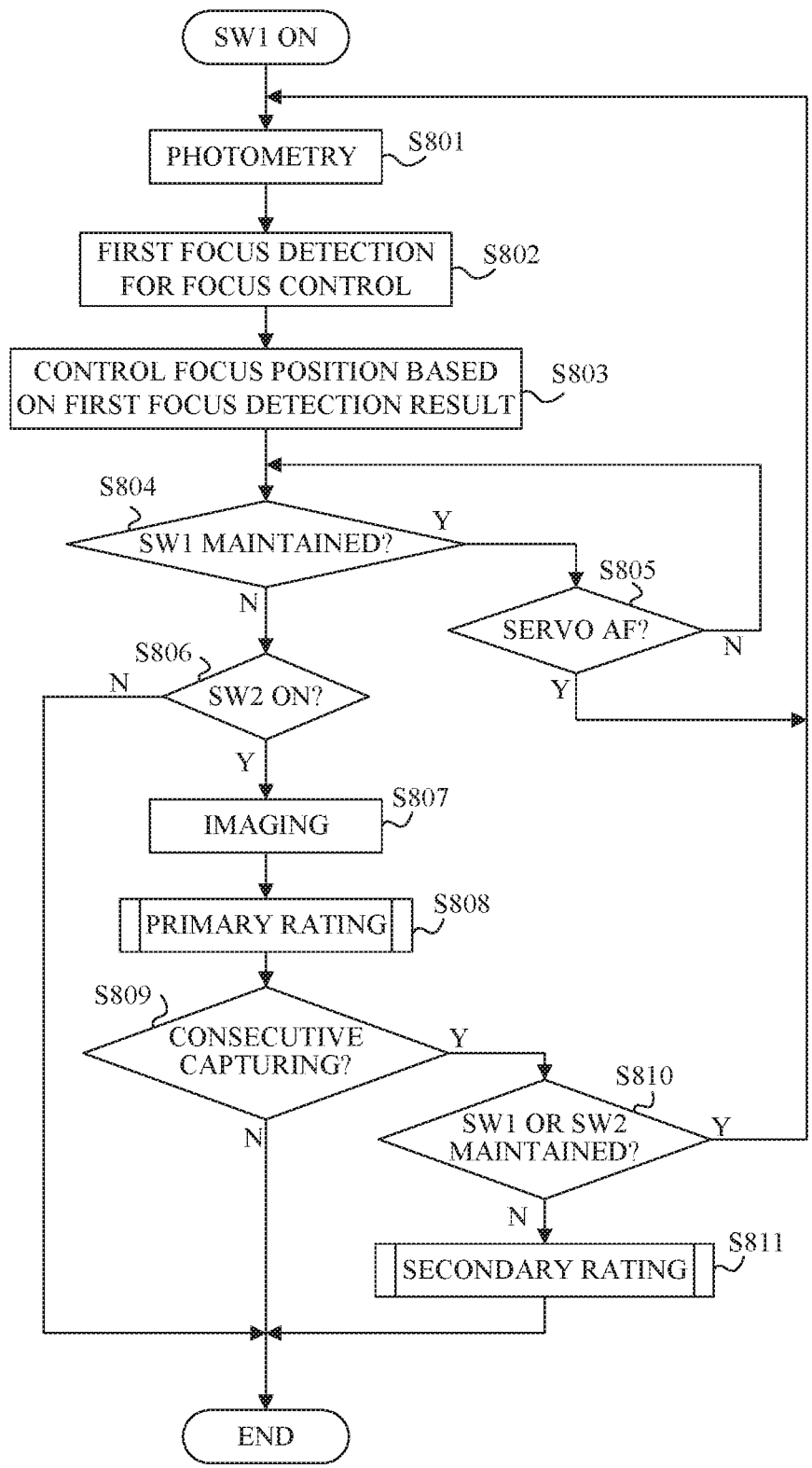
FIG. 8 is a flowchart of processing executed by the digital camera according to the first embodiment.

A flowchart in FIG. 8 illustrates processing (imaging operation and image rating operation) executed by the digital camera according to this embodiment. The camera controller 212 executes this processing in accordance with a computer program. The camera controller 212 corresponds to an image processing apparatus.

Imaging Operation (Steps S801 to S807)

In the initial state just after the power is turned on, the digital camera according to this embodiment sets the still-image single-capturing mode or the still-image consecutive-capturing mode in the mirror-down stale, and the user can view the object image through the viewfinder 206. First, the user turns on the SW1 in the operation switch 211 to thereby execute the processing for the imaging operation from the step S801.

In the step S801, the camera controller 212 causes the photometric sensor 208 to perform the photometry to obtain the photometric result. Thereafter, the camera controller 212 proceeds to the step S802.

In the step S802, the camera controller 212 causes the focus detecting unit 209 to perform the first focus detection for detecting the defocus amount of the imaging optical system (the lens portion 101) to obtain the defocus amount as the first focus detection result. Thereafter, the camera controller 212 proceeds to the step S803.

In the step S803, the camera controller 212 calculates a focus driving amount as a driving amount of the focus lens in the lens portion 101 based on the first focus detection result obtained in the step S802. The camera controller 212 transmits the calculated focus driving amount to the lens controller 104. The lens controller 104 controls the focus position of the lens portion 101 by moving the focus lens through the lens driving unit 103 based on the received focus driving amount. Thereafter, the camera controller 212 proceeds to the step S804.

The current F-number (aperture value) acquired from the aperture stop control unit 106 through the lens controller 104 may be used to calculate the focus driving amount in the step S803. The focus sensitivity, which is a focus driving amount necessary to move the focus position by an amount corresponding to the unit defocus amount, determined for each position of the focus lens and the magnification variation of the reference focus driving amount that optically changes as the defocus amount increases may be acquired from the optical information recorder 107.

In the step S804, the camera controller 212 detects the operation state of the operation switch 211, and determines whether or not the ON operation of SW1 is maintained. If the ON operation of SW1 is maintained, the camera controller 212 proceeds to the step S805, otherwise to the step S806.

In the step S805, the camera controller 212 determines whether the focus detection mode is the servo AF mode. In case of the servo AF mode, the camera controller 212 returns to the step S801 in order to repeatedly perform the photometry and the first AF until the SW2 in the operation switch 211 is turned on. On the other hand, if the focus detection mode is not the servo AF mode but the single-capturing AF mode, the camera controller 212 returns to the step S804 to consecutively monitor the retaining state of the ON operation of the SW1 in the operation switch 211 with the focus position fixed.

In the step S806, the camera controller 212 detects the operation state of the operation switch 211, and determines whether or not the SW2 is turned on. If the SW2 is turned on, the camera controller 212 proceeds to the step S807, otherwise ends this proceeding by assuming that none of the SW1 and the SW2 in the operation switch 211 are turned on.

In the step S807, the camera controller 212 controls the main mirror 201 and the sub mirror 202 to provide the mirror-up state. Then, the camera controller 212 causes the image captures 210 to perform an image capturing operation for acquiring the image capturing signal based on the setting of the charge accumulation time and the ISO speed determined from the photometric result in the step S801. The image capturer 210 photoelectrically converts an object image to acquire an image signal, and generates first RAW data as pupil division image data. The generated first RAW data is transferred to the memory 213.

The camera controller 212 generates the second RAW data and still image data (JPEG file, etc.) in a predetermined file format through predetermined image processing to the second RAW data. The camera controller 212 causes the recorder 219 to record the second RAW data and the still image data. Thereafter, the camera controller 212 proceeds to the step S808 and performs an operation as an image processing apparatus.

Primary Rating (Steps S808, S901 to S903)

In the step S808, the camera controller 212 serving as a first evaluator causes the focus detecting unit 209 to perform the second focus detection using the first RAW data transferred to the memory 213. The defocus amount detector 216 calculates the defocus amount from the result of the second focus detection (the second focus detection result). The second focus detection follows the imaging operation in the step S807 and the focus position control in the step S803 based on the first focus detection result described in the step S802 in the single sequence of this processing.

Figure 9:
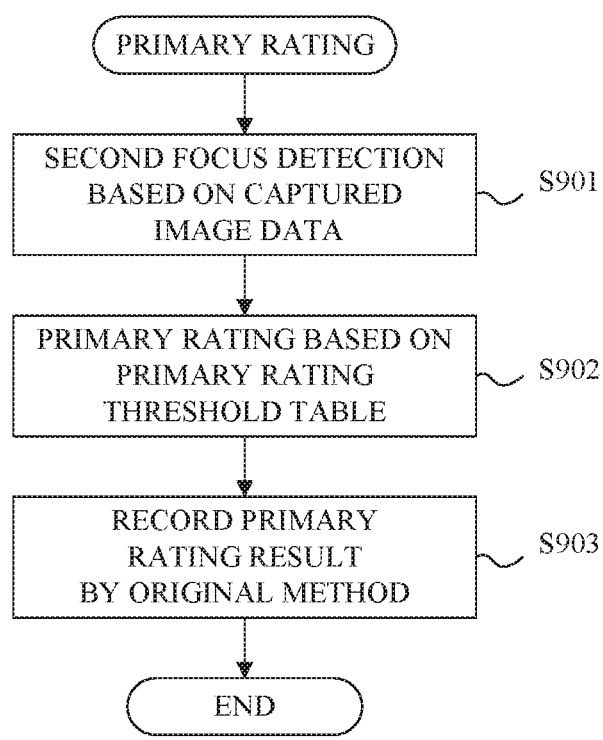
FIG. 9 is a flowchart of primary rating processing according to the first embodiment.

Referring now to FIG. 9, a specific description will be given of the second focus detection. First in the step S901, the camera controller 212 transfers the first RAW data from the memory 213 to the correlation calculator 214. The correlation calculator 214 extracts the image area corresponding to the focus detecting area from the transferred first RAW data and calculates a correlation value for each shift amount between the two image signals obtained from the pair of focus detecting pixel rows in the extracted image area. The phase difference detector 215 calculates the phase difference from the correlation value showing the highest correlation among the correlation values corresponding to the shift amounts. The defocus amount detector 216 acquires the reference defocus amount per unit phase difference determined for each F-number of the aperture stop 102 from the optical information recorder 107. The defocus amount detector 216 calculates the defocus amount based on the acquired reference defocus amount per unit phase difference and the phase difference calculated by the phase difference detector 215. Thereafter, the camera controller 212 proceeds to the step S902.

In the step S902, the camera controller 212 performs the primary rating (evaluation with the first evaluation condition or by the first evaluation method) based on the defocus amount calculated from the second focus detection result. More specifically, the camera controller 212 initially removes a code indicating the perspective direction in the defocus amount calculated on the basis of the second focus detection result, and calculates an absolute value expression as an absolute value of a defocus amount D [µ]. Next, the absolute value of the defocus amount D is compared with a predetermined in-focus level J, and the rating is determined according to the comparison result. The in-focus level J represents a magnification with a product, as a unit amount, of a diameter δ [µm] of the permissible circle of confusion in the image data (captured image) acquired by imaging and an F-number F. As the magnification increases, the in-focus level decreases and an image blur becomes worse.

FIG. 10 illustrates a relationship between the in-focus level J [Fδ], the absolute value of the defocus amount D [µm] calculated based on the second focus detection result, and the corresponding rating. For example, assume that the F-number F of the aperture stop 102 is 2.8 and the diameter δ of the permissible circle of contusion circle is 10 [µm]. Then, when the absolute value of the defocus amount D is 7.0 [µm], the corresponding in-focus level J [67] is obtained by the following expression (1).

$$J=7.0/(2.8\times 10)=0.25 \qquad (1)$$

The primary rating in this embodiment uses totally twelve types including ten ratings with values 1 to 9 based on the in-focus level J illustrated in FIG. 10, a rating with an initial value 0 indicating that no rating has been performed, and a rating with a value −1 indicating that no rating has been performed or the rating has failed. This embodiment sets ten ratings based on the in-focus level J, but may set a smaller or larger number of ratings. The larger number of ratings enables a wider defocus amount range to be rated based on the in-focus level. In addition, a finer rating based on the in-focus level is available by reducing a difference of the in-focus level between the ratings. The camera controller 212 proceeds to the step S903 after determining the ratings in the primary rating.

In the step S903, the camera controller 212 as a recorder records the primary rating result (first evaluation information) in the attribute information area in the corresponding (still) image data. More specifically, as described as a first recording method with reference to FIG. 7, the information describing area in the Exif format is created in the marker segment "APP1" in the image data, and the "MakerNote" field is provided. Then, ten ratings with values 1 to 9 based on the in-focus level J illustrated in FIG. 10 are recorded in that field. This rating recording system can record more ratings with a finer in-focus level difference than the rating based on the XMP format described in Literature 2 although the compatibility with devices of the other manufacturers is low. The camera controller 212 recording the primary rating result ends the primary rating. Thereafter, the camera controller 212 proceeds to the step S809 in FIG. 8.

In the step S809, the camera controller 212 determines whether or not the imaging operation mode is the still-image consecutive-capturing mode. If the imaging operation mode is the still-image consecutive-capturing mode, the camera controller 212 proceeds to the step S810 so as to determine the next operation during the consecutive capturing period. If the imaging operation mode is another imaging operation mode, this flow ends because the image data obtain by imaging has been appropriately classified and recorded.

In the step S810, the camera controller 212 determines whether the operation of turning on the SW2 in the operation switch 211 is continuing (consecutive capturing continuation is instructed) or the SW1 in the operation switch 211 is newly turned on and a focus position control is instructed. The camera controller 12 returns to the step S801 when the SW2 or SW1 is turned on. Thereby, the camera controller 212 shifts the main mirror 201 and the sub mirror 202 to the mirror down state, and performs the photometry and first AF. The camera controller 212 proceeds to the step S811 if neither the SW2 nor the SW1 is turned on. In this embodiment, if the neither SW2 nor the SW1 is turned on, the flow proceeds to the step S811 so as to perform the rating according to the present invention for a plurality of image data. (simply referred to as "images" hereinafter) captured in a consecutive capturing period from when the press of the SW2 starts to when the press is released in the operation switch 211.

Secondary Rating (Steps S811, S1101 to S1103)

In the step S811, the camera controller 212 as the second evaluator performs the secondary rating having ratings less than that of the primary rating based on the primary rating result that is less compatible with other manufacturers, but has a higher freedom degree and more ratings. In other words, the secondary rating condition (second evaluation condition) is variably set according to the primary rating result.

Referring now to a flowchart in FIG. 11 and FIGS. 12 and 13, a detailed description will be given of the secondary rating (evaluation by the second evaluation condition or by the second evaluation method). First, in the step S1101, the camera controller 212 analyzes a distribution of ratings from the primary rating result for each image data obtained by the imaging operation illustrated in the steps S801 to S810 in FIG. 8. Then, the center value and the center of gravity value as statistical values of the distribution are calculated. The center value is an intermediate value between the maximum value and the minimum value of the distribution of the ratings. The center of gravity value is a value obtained by the known center of gravity calculation from the distribution of ratings.

Figures 12, 13:
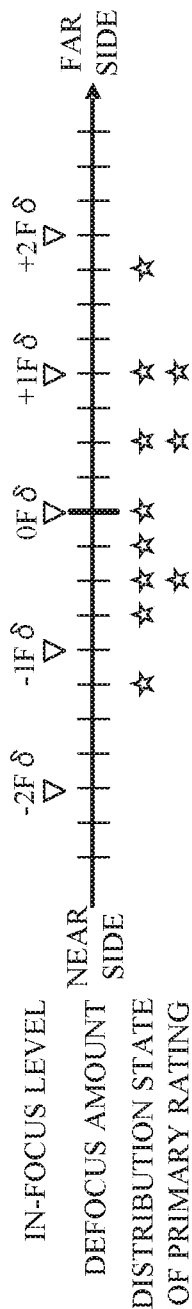
FIG. 12 illustrates an illustrative distribution of primary ratings based on the defocus amount according to the first embodiment.
FIG. 13 illustrates a secondary rating example based on a center value and a center of gravity value in a distribution of the primary rating result according to the first embodiment.

FIG. 12 illustrates a distribution status of ratings in the primary rating based on the defocus amount using an asterisk. In this figure, the primary rating is performed for totally 11 images by setting a threshold for segmenting the in-focus level J [Fδ] to 0.25 [Fδ]. In FIG. 12, two vertically aligned asterisks mean two images suitable for the in-focus level.

FIG. 13 illustrates the secondary rating example based on the center value in the distribution and the secondary rating example based on the center of gravity value in the distribution performed with the in-focus level and the primary rating result. The top row in FIG. 13 shows the in-focus level J [Fδ] segmented for each threshold of 0.25 [Fδ]. The second row shows a representative value for each segment range of the segmented in-focus level J [Fδ]. The representative value is obtained by calculating a median value of the segment range. The representative value of the segment range of the in-focus level is calculated based on the threshold as long as the primary rating result exists. In FIG. 13, the representative value is calculated in each segment range of the in-focus level J having the number of distributions of at least $0 \leq J \leq 1.75$.

The third row in FIG. 13 shows the primary rating result for each in-focus level J. The fourth row shows the illustrative rating distribution number in the primary rating. The fifth row shows an example in which the secondary rating is performed based on the center value in the distribution in the primary rating result, and the seventh row shows the rating distribution number. The minimum representative value in the distribution range of the primary rating is 0.125 and the maximum representative value is 1.625 from the rating distribution number in the primary rating on the fourth row Hence, the median 0.875 of them is determined as the central value.

The sixth row shows an example in which the secondary rating is performed based on the center of gravity value, and the eighth row shows the number of distributions thereof. The center of gravity value is a value obtained by dividing, by the total number of distributions, the total number obtained by multiplying the representative value for each segmented in-focus level by the distribution number, and is 0.625 in FIG. 13. The segment range of the in-focus level J to which the center of gravity value of 0.625 is applied is $0.50 < J \leq 0.75$. The camera controller 212 that has thus calculated the statistical value proceeds to the step S1102.

In the step S1102, the camera controller 212 determines which one of the center value and the center of gravity value in the rating distribution has a less rating bias, when the primary rating result falls within six stages from 0 to 5 in the XMP profile. The rating bias means that the distribution concentrates on one specific rating. In other words, the camera controller 212 selects one of the center value and the center of gravity value having a lower maximum value of the distribution number for each rating. Then, the rating values 1 to 5 are used based on the rating of the XMP profile highly compatible with other devices, except for the value 0 as the initial value that means that no rating is performed, and the number of segment ranges of the in-focus level to be determined is set to five.

In FIG. 13, the primary rating result has a center value of 0.875 and thus the number of distributions is calculated in each of totally five segment ranges with the in-focus level of $0.50 \leq J \leq 1.50$ around the segment range with the in-focus level of $0.75 < J \leq 1.00$. As a result of the calculation, in the illustrative distribution in FIG. 13, the distribution number has a maximum value of 6 in the segment range with the in-focus level of 0.50<J≤0.75.

In FIG. 13, the primary rating result has a center of gravity value of 0.625 and thus the number of distributions is calculated in totally five segment ranges with the in-focus level of 0<J≤1.25 around the segment range with the in-focus level of 0.50<J≤0.75. As a result of the calculation, in the illustrative distribution in FIG. 13, the distribution number has a maximum value of 4 in the segment range with the in-focus level of 0.25<J≤0.50.

When the distributions of the center value and the center of gravity value in the primary rating result are compared with each other, the maximum value of the distribution number of the center of gravity value is smaller and thus the rating bias is smaller in the center of gravity value. Hence, in the illustrative distribution in FIG. 13, the camera controller 212 determines to finally employ the secondary rating based on the center of gravity value of the distribution number. The camera controller 212 that makes this determination proceeds to the step S1103.

In the step S1103, the camera controller 212 as the recorder obtains the secondary rating result (the second evaluation information) corresponding to the totally five segment ranges of the in-focus level J which was calculated and employed in the step S1102, in an attribute area of the corresponding image data. As a specific recording operation, as described in the second recording method with reference to FIG. 7, an information describing area in the XMP profile is created in the marker segment "APP1" in the image data, a "Rating" column is provided, and the secondary rating result is described in the column. This rating recording system can record the rating result which is unlikely to cause bias in the rating while maintaining the high compatibility with other manufacturers. The camera controller 212 that has thus recorded the secondary rating result ends the secondary rating. It ends the step S811 in FIG. 8.

This embodiment can easily avoid the biased rating result or prevents the ratings from substantially failing, and enables the user to reproduce and view images with higher in-focus levels.

This embodiment assumes that the in-focus level difference (or defocus amount difference) between ratings in the primary rating is the same as the in-focus level difference between ratings in the secondary rating, but they may be different from each other.

Second Embodiment

The first embodiment determines the range of the in-focus level for the secondary rating based on the distribution state in the primary rating result of the in-focus level. On the other hand, a second embodiment according to the present invention has a rating mode that can select a range of an in-focus level for the secondary rating in advance.

Figure 14:
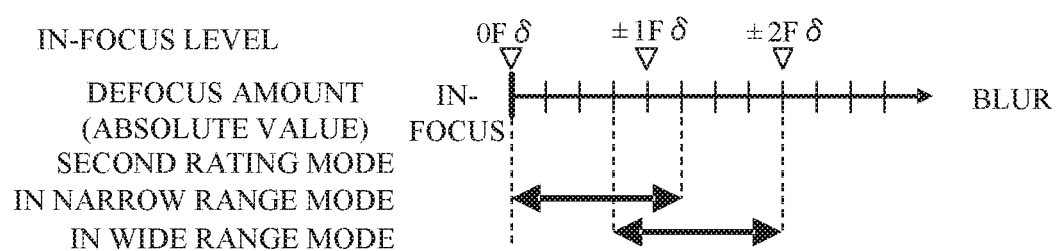
FIG. 14 explains a secondary rating mode in a digital camera according to a second embodiment of the present invention.
Figure 15:
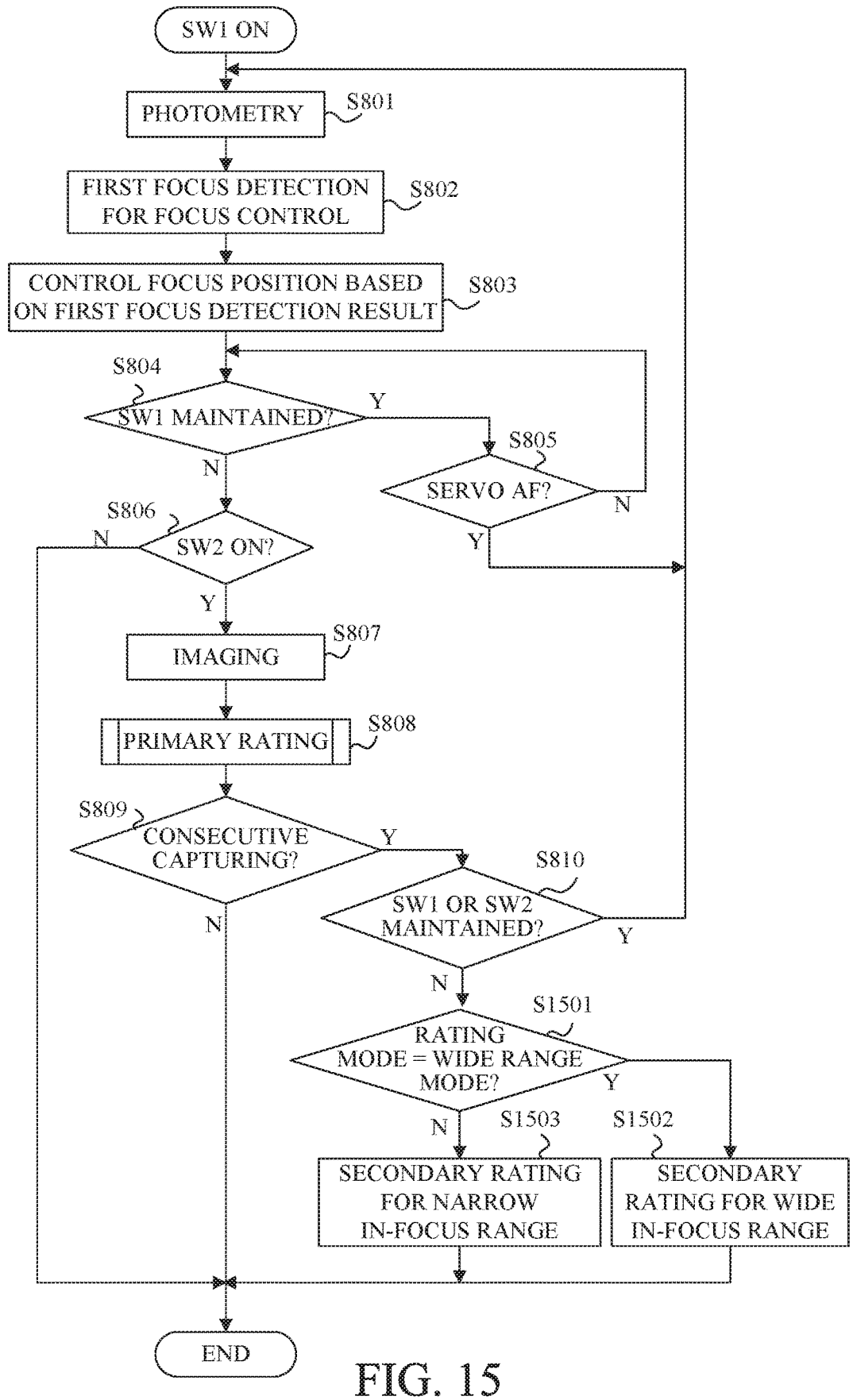
FIG. 15 is a flowchart of processing executed by the digital camera according to the second embodiment.

Referring now to FIG. 14 and a flowchart in FIG. 15, a description will be given of the second embodiment. Herein, a difference between this embodiment and the first embodiment will be described, and a common description will be omitted.

The digital camera according to this embodiment includes a narrow range mode as a rating mode that performs the secondary rating by addressing the distribution of a narrow defocus amount range (in-focus level range) close to the in-focus state in the primary rating result. It further includes a wide range mode that performs the secondary rating by addressing the distribution of a wide defocus amount range away from the in-focus state in the primary rating result. In other words, the rating range (range of the evaluation stage) in the secondary rating is variably set in the rating range in the primary rating.

FIG. 14 illustrates a sating example of the rating mode. As illustrated in FIG. 14, the narrow range mode performs the secondary rating for the range of the in-focus level J [Fδ] of −1.25≤j≤+1.25. The wide range mode performs the secondary rating for the range of in-focus level J [Fδ] of −2.00≤J<−0.75 and the range of +0.75<J≤+2.00. Assume that an arbitrary range of the in-focus level J can be set to each of the narrow range mode and the wide range mode. As a setting example, the range of the in-focus level J in the narrow range mode is sot by assuming a high-definition gravure printing output, and the range of in-focus level J in the wide range mode that is wider on the defocus side than the narrow range mode is set by assuming a coarse halftone dot printing output such as newspaper.

The rating operation performed by the digital camera according to this embodiment is set to the still-image single-capturing mode or the still-image consecutive-capturing mode in the mirror down state in the initial state just after the power is turned on while the user can confirm the object image through the viewfinder 206. Now assume that the user has selected either the narrow range mode or the wide range mode through the user operation.

First, in response to the ON operation of the SW1 in the operation switch 211 by the user, the camera controller 212 performs the operations of the steps S801 to S810 described with reference to FIG. 8. If it is determined in the step S810 that the SW1 or the SW2 in the operation switch 211 has not yet been turned on, the camera controller 212 proceeds to the step S1501.

In the step S1501, the camera controller 212 determines the selected rating mode, proceeds to the step S1502 if the wide range mode is selected, and proceeds to the step S1503 if the narrow range mode is selected.

In the step S1502, the camera controller 212 sets the threshold value for segmenting the in-focus level J [Fδ] to 0.25 [Fδ], and creates totally five segment ranges using a threshold as a boundary so that the primary rating result corresponds to the wide range mode. Then, the secondary rating is performed in each of the five segment ranges. The distribution of the in-focus level located outside the defocus region addressed in the wide range mode is included in the segment range of the closest in-focus level J. The camera controller 212 that has completed the secondary rating ends the processing of this flow according to this embodiment.

In the step S1503, the camera controller 212 sets the threshold for segmenting the in-focus level J [Fδ] to 0.25 [Fδ], and creates totally five segment ranges using a threshold as a boundary so that the primary rating result corresponds to the narrow range mode. Then, the secondary rating is performed for each of the five segment ranges. The distribution of the in-focus level located outside the defocus region of interest in the narrow range mode is included in the closest segment range of the in-focus level J. The camera controller 212 that has completed the secondary rating ends this processing according to this embodiment.

This embodiment can designate a rating range of interest based on a characteristic of the image output destination such as an image output resolution, so that the user can reproduce and view image in descending order of the in-focus level of interest by the user. A specific example sets the range of the in-focus level J in the narrow range mode by assuming the high-definition gravure printing output described with reference to FIGS. 13 to 14. The range of the in-focus level J is set in the narrow range mode by assuming the coarse halftone dot priming output such as newspaper. In the high-resolution gravure printing output, a small defocus amount difference is likely to be visually recognizable. In the coarse halftone dot printing output such as newspaper, finer than halftone spacing cannot be resolved and a minute defocus amount difference is not visually recognizable. The setting described above narrows the in-focus level J having the highest quality level, e.g., as narrow as a range of $-0.25<J<0.25$ [F$\delta$], in the high-definition gravure printing output, and can provide an image suitable for the highest quality level. The in-focus level J having the poor quality level can be strictly assigned to the ranges of $-1.25<J$ [F$\delta$] and $1.25>J$ [F$\delta$]. On the other hand, if the characteristic of the image output destination is not considered, for example, in the rating for the high-definition gravure printing output, the same ratings may be set to an image with the poor in-focus level J and an image with the highest quality. For example, in the rating for the coarse halftone dot printing output such as newspaper, even if the highest quality level may be slightly deteriorated without a problem, fine rating may be uselessly made around the highest quality level. In recording the rating by a method having the small number of expressible ratings as exemplified in Literature 2 may not express a useful rating difference according to the characteristic of the image output destination. The above operation prevents the unnecessary rating from being determined while allows the necessary determination along the purposes of a variety of types of printing outputs.

<Modification>

The second embodiment has discussed two selectable types, the wide range mode and the narrow range mode, for the rating mode. However, three or more rating modes may be selectable. The in-focus level ranges in these rating modes may partially overlap each other.

Figures 25, 26:
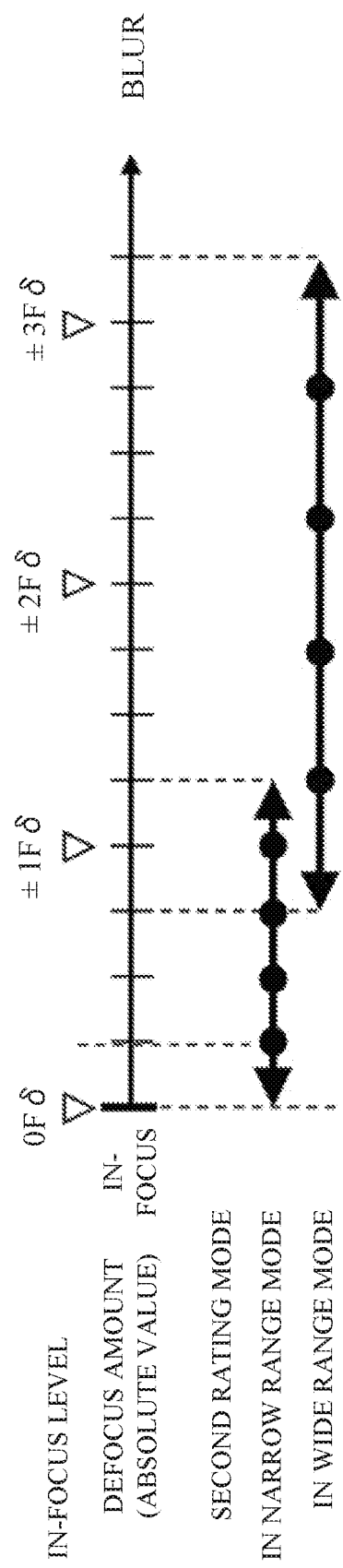
FIG. 25 illustrates a relationship between an absolute value of a defocus amount and a rating in the secondary rating processing according to the sixth embodiment.
FIG. 26 illustrates a secondary rating mode in the digital camera according to the sixth embodiment of the present invention.

As illustrated in FIG. 14, the second embodiment makes equal the defocus amount difference per one rating difference or the resolution of the defocus amount per one rating in the rating mode such as the wide range mode and the narrow range mode. However, as illustrated in FIG. 26, the wide range mode and the narrow range mode may have different differences. For example, the resolution of the wide range mode for the coarse halftone dot printing output such as newspaper can be made lower than the resolution in the narrow range mode for the high-definition gravure printing output because a fine defocus amount difference cannot be visually recognized and the resolution is inadvertently prevented from being finer. Moreover, this configuration can properly widen the in-focus level range for the rating difference.

Third Embodiment

The first embodiment performs the secondary rating for the high compatibility based on the distribution of the in-focus levels based on the defocus amount of the captured image. In contrast, a third embodiment according to the present invention changes the range of the in-focus level of interest in the secondary rating in accordance with the reliability of the defocus amount based on the predetermined index relating to the focus detection.

Figure 16:
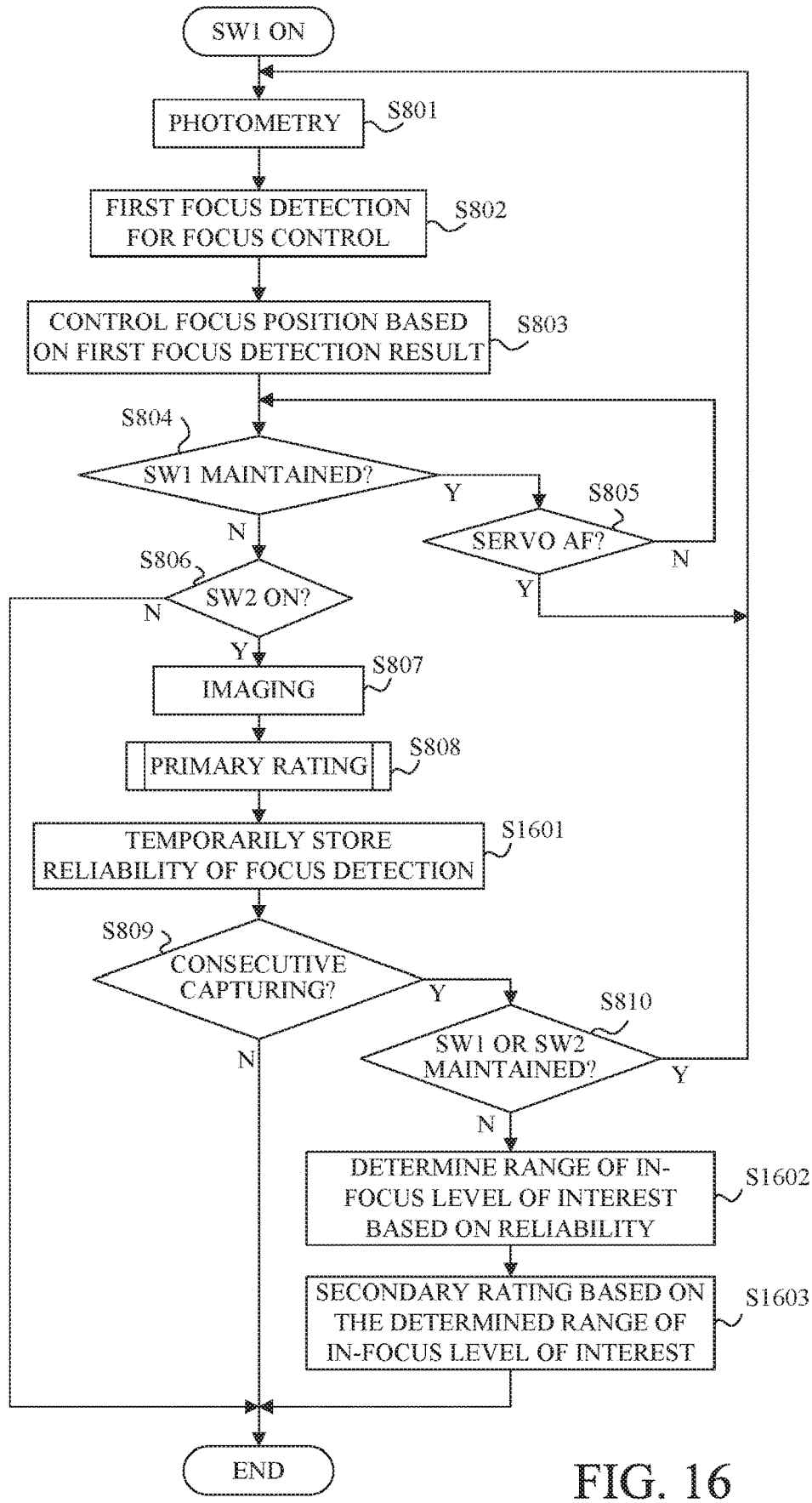
FIG. 16 is a flowchart of processing executed by a digital camera according to a third embodiment of the present invention.

Referring now to FIG. 16, a description will be given of the third embodiment. The difference between this embodiment and the first embodiment will be described, and a common description will be omitted.

The rating operation performed by the digital camera according to this embodiment is set to the still-image single-capturing mode or the still-image consecutive-capturing mode in the mirror down state in the initial state just after the power is turned on while the user can confirm the object image through the viewfinder 206. First, in response to the ON operation of the SW1 in the operation switch 211 by the user, the camera controller 212 performs the operations of steps S801 to S808 described with reference to FIG. 8.

The camera controller 212 having proceeded from the step S808 to the step S1601 temporarily stores the focus detection reliability indicating the reliability of the defocus amount based on the predetermined index in the first focus detection in the step S901 described with reference to FIG. 9. An illustrative predetermined index is the ISO speed of the image used for the first focus detection. The high ISO speed of the image mixes noises into the phase difference image signal in the focus detection and deteriorates the accuracy of the correlation calculation and finally the focus detection accuracy. For example, this embodiment sets the number of exposure stages from the lowest sensitivity to the highest sensitivity of the ISO speed as the maximum value of the focus detection reliability. If the ISO speed can be controlled from ISO 100 to ISO 6400, the maximum value of the focus detection reliability is set to 6. Then, as the ISO speed of the image increases by one exposure stage, the reliability value is set so that the focus detection reliability is reduced by one point from the maximum value. The maximum value of the focus detection reliability may be normalized so as to be a predetermined value such as a value 10.

Another example of the predetermined index is a magnitude of the difference value between the maximum value and the minimum value of the phase difference image signals obtained from the photoelectric conversion element arrays 607a and 607b illustrated in FIG. 6. A small difference value means a relatively large ratio of noises in the phase difference image signal and causes a low correlation calculation accuracy and a low focus detection accuracy. For example, this embodiment sets the maximum value of the focus detection reliability to the value 10 and when the difference value is smaller than the luminance variation amount for the three exposure stages as a reference, the focus detection reliability is set using the following expression (2).

Focus Detection Reliability=Difference Value/Luminance Change Amount for Three Exposure Stages×Maximum Value10 (2)

This setting can lower the focus detection reliability by a ratio at which the noise influence degree increases due to the decrease in the difference value.

Yet another example of the predetermined index is the maximum value of the differential value of the phase difference image signal obtained from the photoelectric conversion element arrays 607a and 607b illustrated in FIG. 6 or the maximum value of the secondary differential value. More edges of the object image included in the phase difference image signal improve the accuracy of the correlation calculation. Conversely, the less edges of the object image lower the accuracy of correlation calculation. This embodiment provides a predetermined reference value and sets the maximum value of the focus detection reliability to the value 10. If the maximum value of the differential value or the secondary differential value is lower than the predetermined reference value, the focus detection reliability is set using the following expression (3).

Focus Detection Reliability=Differential Value or Secondary Differential Value/Reference Value×Maximum Value10 (3)

This setting can lower the focus detection reliability by the ratio at which the noise influence degree increases due to the decrease of the differential value or the second derivative value.

A still another example of the predetermined index is a correlation change amount as a change amount of the correlation value when a shift amount (phase difference) that maximizes the correlation of the pair of phase difference image signals (two image signals) in the correlation calculation is moved by one pixel back and forth. The higher the correlation change amount is, the more accurately the two image signals coincide with each other or the more accurate the correlation calculation is. In this embodiment, the correlation value when the correlation between the two image signals becomes the highest in the correlation calculation will be referred to as the highest correlation value, and the correlation values moved by one pixel back and forth from the shift amount at which this highest correlation value will be referred to as adjacent correlation values. A small difference between the highest correlation value and the adjacent correlation value means a slight coincidence difference between the two image signals or the low correlation calculation accuracy because the correlation value is likely to vary due to the noises. Hence, this embodiment provides a predetermined reference value and sets the focus detection reliability to a value 10, and when the correlation change amount is lower than the predetermined reference value, the focus detection reliability is set using the following expression (4).

Focus Detection Reliability=Correlation Change Amount/Reference Value×Maximum Value10 (4)

This setting can lower the focus detection reliability according to the noise resistance characteristic of the correlation in the phase difference between the two image signals having the highest correlation.

Another example of the predetermined index may determine the general focus detection reliability using a plurality of the above indexes.

The camera controller 212 temporarily stores the focus detection reliability calculated by the above method in the memory 213, and then performs the operations in the steps S809 and S810 described with reference to FIG. 8. In this embodiment, unlike the first embodiment, unless the SW1 or the SW2 in the operation switch 211 is turned on in the step S810, the flow proceeds to the step S1602 in FIG. 16.

In the step S1602, the camera controller 212 determines the range of the in-focus level of interest based on the focus detection reliability temporarily stored in the memory 213. More specifically, for example, for the maximum value of the focus detection reliability such as the value 10, the segment range of the in-focus level J of interest is moved in the defocus direction by the reduction amount of the actual focus detection reliability.

FIG. 17 illustrates an illustrative movement of the segment range of the in-focus level J. In FIG. 17, when the focus detection reliability has the maximum value 10, the highly accurate focus detection is likely to be performed down to a fine defocus amount. Thus, the secondary rating is performed for the range of the in-focus level J for five ratings from the highest value in the primary rating.

When the focus detection reliability is 9 lower than the maximum value 10 by 1, it is determined that segmenting the range of the in-focus level J of −0.2≤J≤+0.25 [Fδ] is useless due to the influence of the focus detection scattering. Then, the secondary rating is performed for the ranges of the in-focus level J of −1.50≤J<−0.25 and +0.25<J≤+1.50. If the focus detection reliability has a low value such as a value of 7 or less, the same rating may be uniformly performed as shown in the eighth and twelfth rows in FIG. 17. The camera controller 212 that has determined the range of focus of in-focus level J in this way proceeds to the step S1603.

In the step S1603, the camera controller 212 performs the secondary rating as illustrated in FIG. 17 according to the determined range of the in-focus level J of interest, and the secondary rating result is recorded into the attribute area in corresponding image data. The specific recording operation is as described with reference to FIG. 7 in the first embodiment, and this rating recording method records the rating result that maintains the high compatibility with the other manufacturers, and is less likely to cause the rating bias. The camera controller 212 that has recorded the secondary rating result ends the secondary rating.

This embodiment can perform efficient rating while suppressing the useless rating gradation, based on the focus detection reliability. Thereby, the user can reproduce and view images in order from a substantially high in-focus level.

Fourth Embodiment

The third embodiment describes the efficient rating while moving the segment range of the in-focus level of interest based on the focus detection reliability. A fourth embodiment according to the present invention performs a focus detection even for an area that is presumed to be a background other than the focus detecting area of interest, and changes the range of the in-focus level of interest in the secondary rating according to the perspective separation degree based on the difference in the focus detection result between the main object and the background. It is a purpose of this embodiment to enhance the rating of the image strictly focused on the main object for the image having a fine defocus amount although the main object is contained in the depth of field, when the focus positions of the main object and the focal point are close to each other.

Referring now to FIGS. 18 to 21, a description will be given of the fourth embodiment. The difference between this embodiment and the first embodiment will be described, and the common description will be omitted.

<Configuration of Digital Camera>

Figure 18:
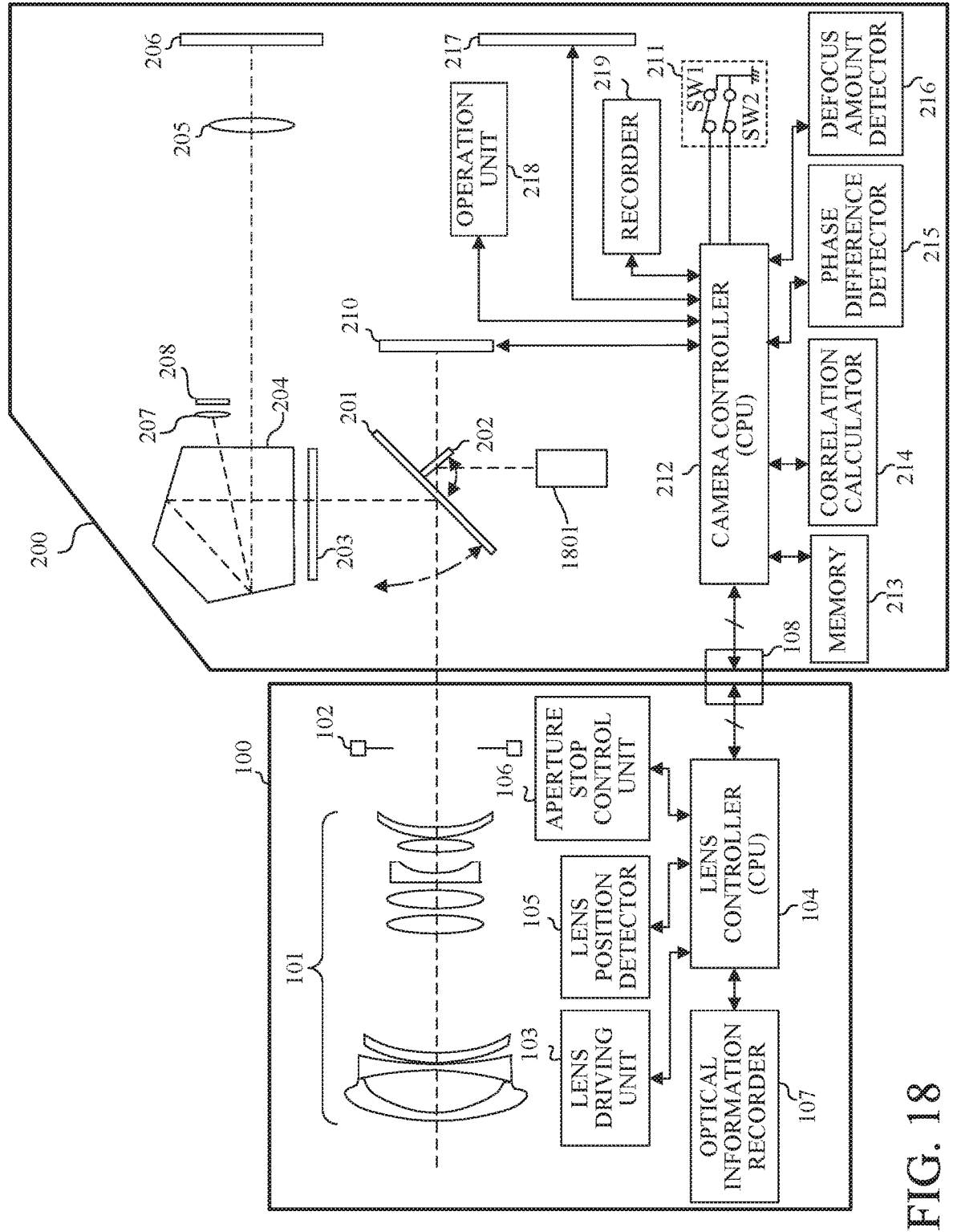
FIG. 18 illustrates a configuration of a digital camera according to a fourth embodiment of the present invention.

FIG. 18 illustrates a configuration of a digital camera according to this embodiment. The digital camera according to this embodiment is different from the digital camera according to the first embodiment (FIG. 1) in that a multipoint focus detecting unit 1801 is provided instead of the focus detecting unit 209. The first embodiment fixes the focus detecting area for the focus detecting unit 209 to a single position such as the center of the imaging view angle. On the other hand, in this embodiment, the multipoint focus detecting unit 1801 has a plurality of focus detecting areas within the imaging view angle.

<Focus Detecting Area of Multipoint Focus Detecting Unit 1801>

Figure 19:
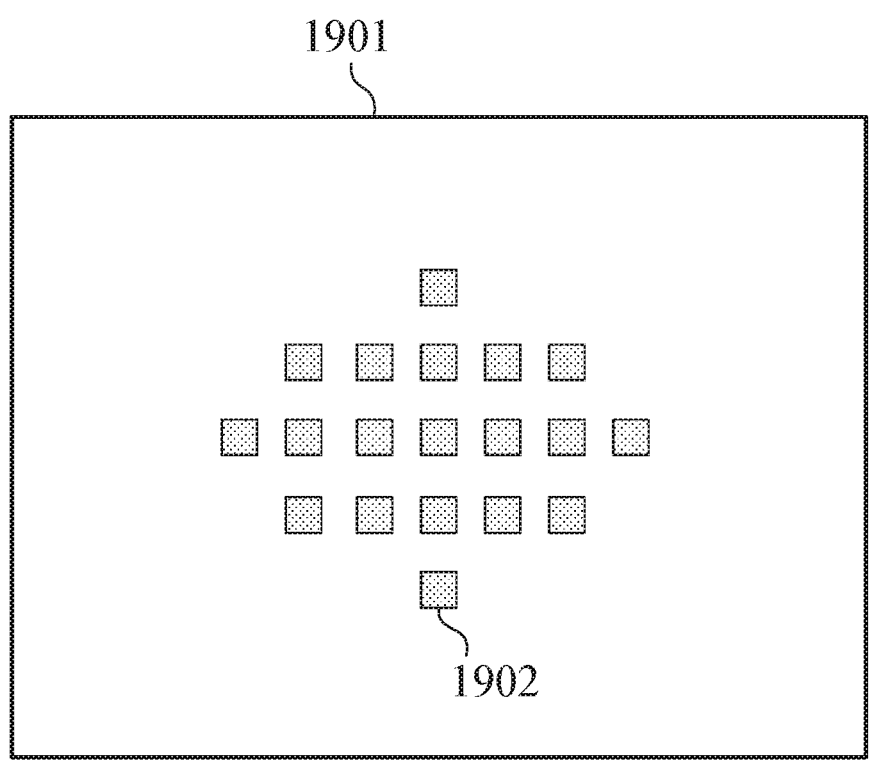
FIG. 19 illustrates a plurality of focus detecting areas that can be selected by a focus detecting unit according to the fourth embodiment.

FIG. 19 illustrates a plurality of focus detecting areas selectable by the multipoint focus detecting unit 1801. A plurality of focus detecting areas 1902 indicated by hatched rectangles are arranged in a two-dimensional imaging range 1901 recorded by imaging. If an object is included in any one of the focus detecting areas 1902 in the imaging range 1901, the multipoint focus detecting unit 1801 can be used to perform a focus detection for the object. The focus detection is performed using two image signals from corresponding regions of the plurality of focus detecting areas 1902 on the imaging surface of the imaging capturer 210.

<Operation of Digital Camera>

Figure 20:
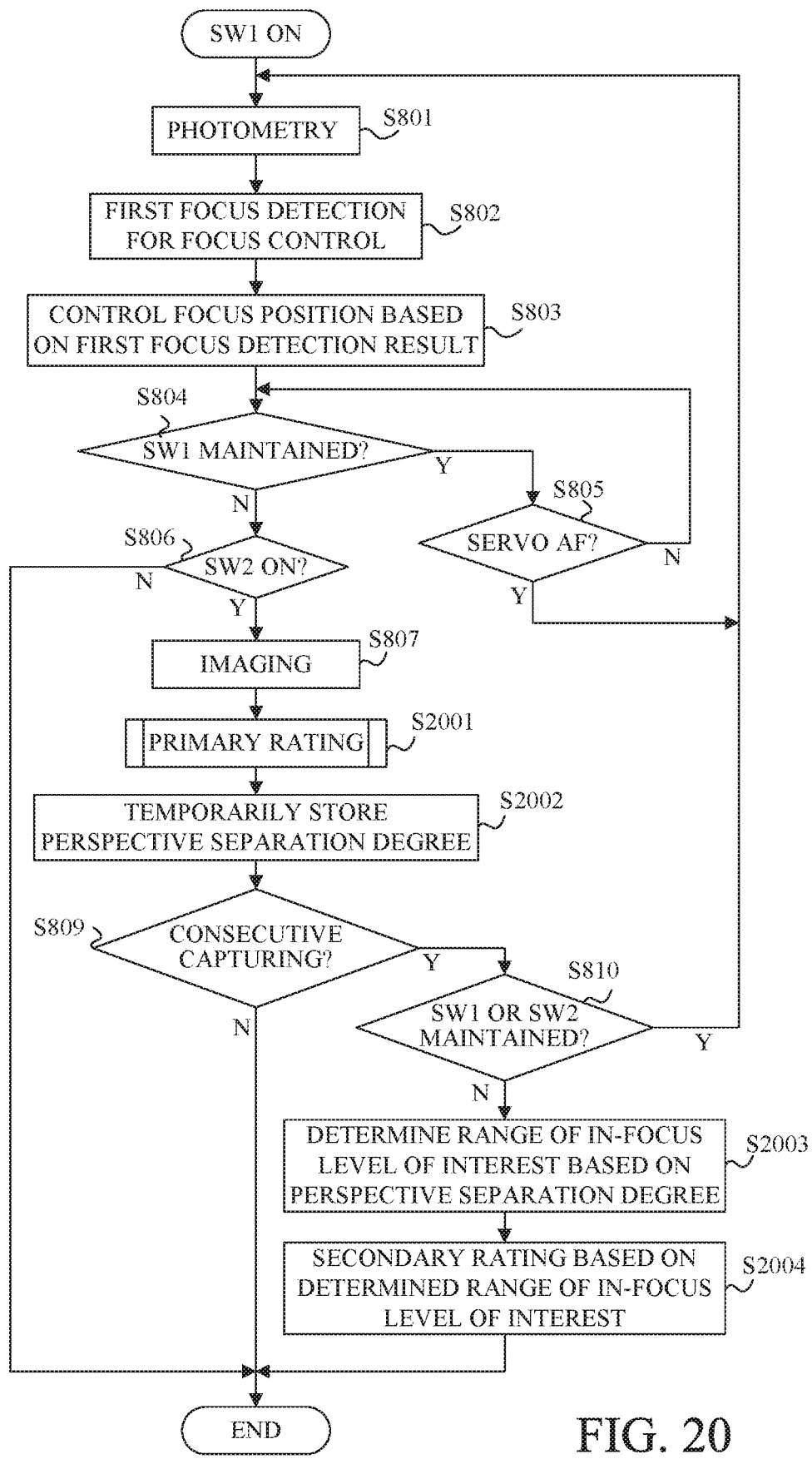
FIG. 20 is a flowchart of processing executed by the digital camera according to the fourth embodiment.

A flowchart in FIG. 20 illustrates the image rating operation in the digital camera according to this embodiment.

The rating operation in the digital camera according to this embodiment is set to the still-image single-capturing mode or the still-image consecutive-capturing mode in the mirror down state in the initial state just after the power is turned on while the user can visually confirm the object image through the viewfinder 206. The operation according to this embodiment is started when the user presses the SW1 in the operation switch 211, and the same operation as the steps S801 to S807 described with reference to FIG. 8 is performed. In this embodiment, unlike the first embodiment, after the operation in the step S807, the flow proceeds to the step S2001.

The rating operation in the digital camera according to this embodiment is set to the still-image single-capturing mode or the still-image consecutive-capturing mode in the mirror down state in the initial state just after the power is turned on while the user visually confirms the object image through the viewfinder 206. First, in response to the ON operation of the SW1 of the operation switch 211 by the user, the camera controller 212 performs the operations of the steps S801 to S807 described with reference to FIG. 8. Then, the flow proceeds from the step S807 to the step S2001.

In the step S2001, the camera controller 212 causes the multipoint focus detecting unit 1801 to perform the second focus detection in the plurality of focus detecting areas using the first RAW data transferred to the memory 213. The defocus amount detector 216 obtains the defocus amount based on the result of the second focus detection. The second focus detection in this embodiment follows the imaging operation in the step S807, and thus is performed after the focus position control in the step S803 based on the result of the first focus detection described in the step S802 in a single sequence illustrated in FIG. 20.

The second focus detection will be described more concretely with reference to FIG. 21. First, in the step S2101, the camera controller 212 transfers the first RAW data from the memory 213 to the correlation calculator 214. The correlation calculator 214 extracts the image area corresponding to each of the plurality of focus detecting areas 1902 from the transferred first RAW data, and calculates the correlation value between the two image signals for each of the extracted image areas. The phase difference detector 215 specifies the correlation value indicating the highest correlation among the correlation values for each focus detecting area, and calculates the phase difference from the shift amount between the two image signals, which provides the correlation value.

The defocus amount detector 216 acquires the reference defocus amount per unit phase difference determined for each F-number of the aperture stop 102 from the optical information recorder 107. The defocus amount detector 216 calculates the defocus amount for each focus detecting area based on the obtained reference defocus amount per unit phase difference and the phase difference calculated by the phase difference detector 215. Thereafter, the camera controller 212 proceeds to the step S210.

In the step S2102, the camera controller 212 specifies a main object focus detecting area including the main object and a background focus detecting area including the background from the plurality of focus detecting areas 1902. For example, the camera controller 212 specifies the focus detecting area closest to the near (short-distance) side as the main object focus detecting area, and specifies the focus detecting area closest to infinity as the background focus detecting area. Among two or more focus detecting areas close to the center of the two-dimensional imaging range 1901, a focus detecting area on the near side of the average focus position calculated in the entire focus detecting area 1902 may be specified as the main object focus detecting area. In specifying the background focus detecting area, a focus detecting area including the object (background) closest to infinity except for the infinity object such as a cloud in the sky may be specified as the background focus detecting area. Thereafter, the camera controller 212 proceeds to the step S902.

In the steps S902 and S903, the camera controller 212 performs the primary rating and the input into the MakerNote item column by the original method in the same manner as that described in the steps S902 and S903 in FIG. 9. Thereafter, the camera controller 212 proceeds to the step S2002.

In the step S2002, the camera controller 212 temporarily stores in the memory 213 the defocus amount calculated in each of the main object and background focus detecting areas specified in the step S2101. Thereafter, the camera controller 212 proceeds to the step S809.

In the steps S809 and S810, the camera controller 212 performs the same operation as the steps S809 and S810 described with reference to FIG. 8. In this embodiment, if it is determined in the step S810 that the SW1 or the SW2 in the operation switch 211 has not been turned on, the camera controller 212 proceeds to the step S2003.

In the step S2003, the camera controller 212 determines the segment range of the in-focus level of interest based on the defocus amount of each of the main object and the background temporarily stored in the step S2002. For example, when the defocus amount of the main object is 0.1 [Fδ] and the defocus amount of the background is 1.0 [Fδ], the difference between these defocus amounts is 0.9 [Fδ]. Assume that the threshold of the perspective separation degree between the main object and the background is 1.0 [Fδ], the defocus amount difference is within the threshold value and thus the perspective separation degree is small. Then, the camera controller 212 determines to address the segment range of the in-focus level with a small defocus amount. The threshold may be set in multiple stages. In the above example, the threshold may be set in units of 1.0 [Fδ] and the segment range of the in-focus level of interest may be moved according to the threshold stage. Conversely, when the defocus amount difference is larger than the threshold, the camera controller 212 performs an operation that addresses the segment range of the in-focus level as described in the first to third embodiments. The camera controller 212 that has determined the segment range of the in-focus level of interest proceeds to the step S2004.

In the step S2004, the camera controller 212 performs the secondary rating according to the segment range of the in-focus level of interest determined in the step S2003, and records the secondary rating result in the attribute area in the corresponding image data. The specific recording operation is as described with reference to FIG. 7 in the first embodiment. This rating recording method can record the rating result that maintains the high compatibility with other manufacturers and is unlikely to cause the rating bias. The camera controller 212 that has recorded the secondary rating result ends the secondary rating.

This embodiment can determine the proper rating number based on the perspective separation degree between the main object and the background. Thereby, the user can reproduce and view the image of the main object separated from the background based on the in-focus level and having a substantially high in-focus level.

Fifth Embodiment

The first to fourth embodiments have discussed the second focus detection performed in the digital camera. On the other hand, according to a fifth embodiment of the present invention, an image processing apparatus computer) provided outside the digital camera performs the second focus detection by executing processing in accordance with a computer program, and rates the image data based on the second focus detection result. The fifth embodiment connects the recorder 219 in the digital camera to an external computer, and the computer performs a focus detection using the second RAW data and rates images according to the focus detection result.

Similar to the first embodiment, this embodiment stores the second RAW data including the pupil division image data in the recorder 219 as a detachable storage medium. The recorder 219 further stores the F-number in imaging, a reference lens driving amount of the mounted lens in imaging, and its magnification variation information in association with the second RAW data.

<Configuration of Image Processing Apparatus>

Figure 22:
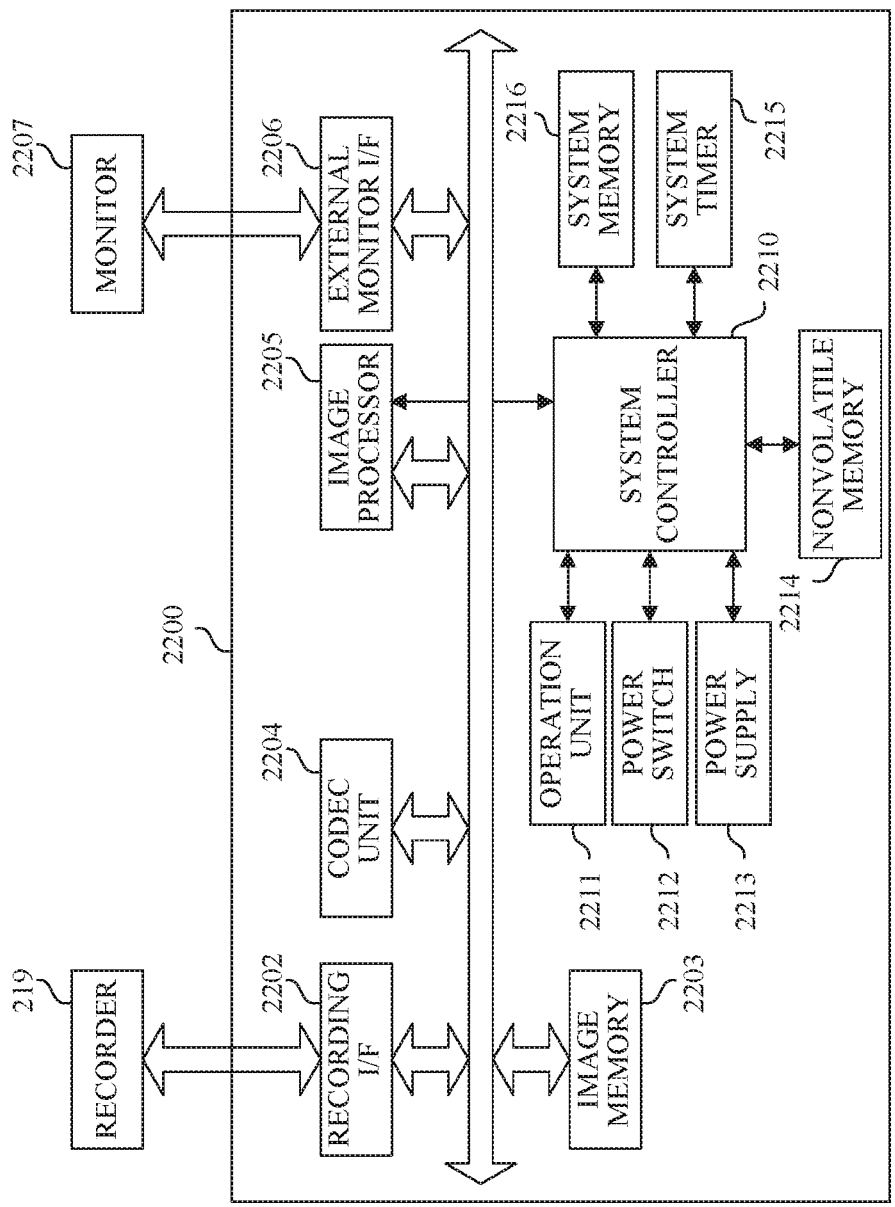
FIG. 22 illustrates a configuration of a computer (image processing apparatus) according to a fifth embodiment of the present invention.

FIG. 22 illustrates a configuration of a computer as an image processing apparatus according to this embodiment. A system controller 2210 accepts image reading from the recorder 219 in response to the user operating an operation unit 2211 including a mouse, a keyboard, a touch panel, and the like. In response, the system controller 2210 causes an image memory 2203 to record the image data recorded in the recorder 219 attachable to and detachable from the computer 2200 via a recording interface (I/F) 2202.

When the image data read out of the recorder 219 is compressed and coded data, the system controller 2210 transmits the image data recorded in the image memory 2203 to a codec unit 2204. The codec unit 2204 decodes the compressed and coded image data and outputs the decoded image data to the image memory 2203. The system controller 2210 outputs the decoded image data accumulated in the image memory 2203 or the uncompressed image data such as the Bayer RGB format (RAW format) to an image processor 2205.

The image processor 205 performs image processing for the uncompressed image data and stores the resultantly processed image data in the image memory 2203. The system controller 2210 reads the processed image data out of the image memory 2203 and outputs it to the monitor 2207 via an external monitor interface (I/F) 2206.

As illustrated in FIG. 22, the computer 2200 includes a power switch 2212, a power supply 2213, and a nonvolatile memory 2214 configured to store a computer program. The computer 2200 also includes a system timer 2215 that measures the time used for a variety of controls and the time counted by the built-in timer. The computer 2200 includes a system memory 2216 configured to store constants and variables for operations of the system controller 2210 and to develop the computer program read out of the nonvolatile memory 2214.

<Operation of Image Processing Apparatus>

Figure 23:
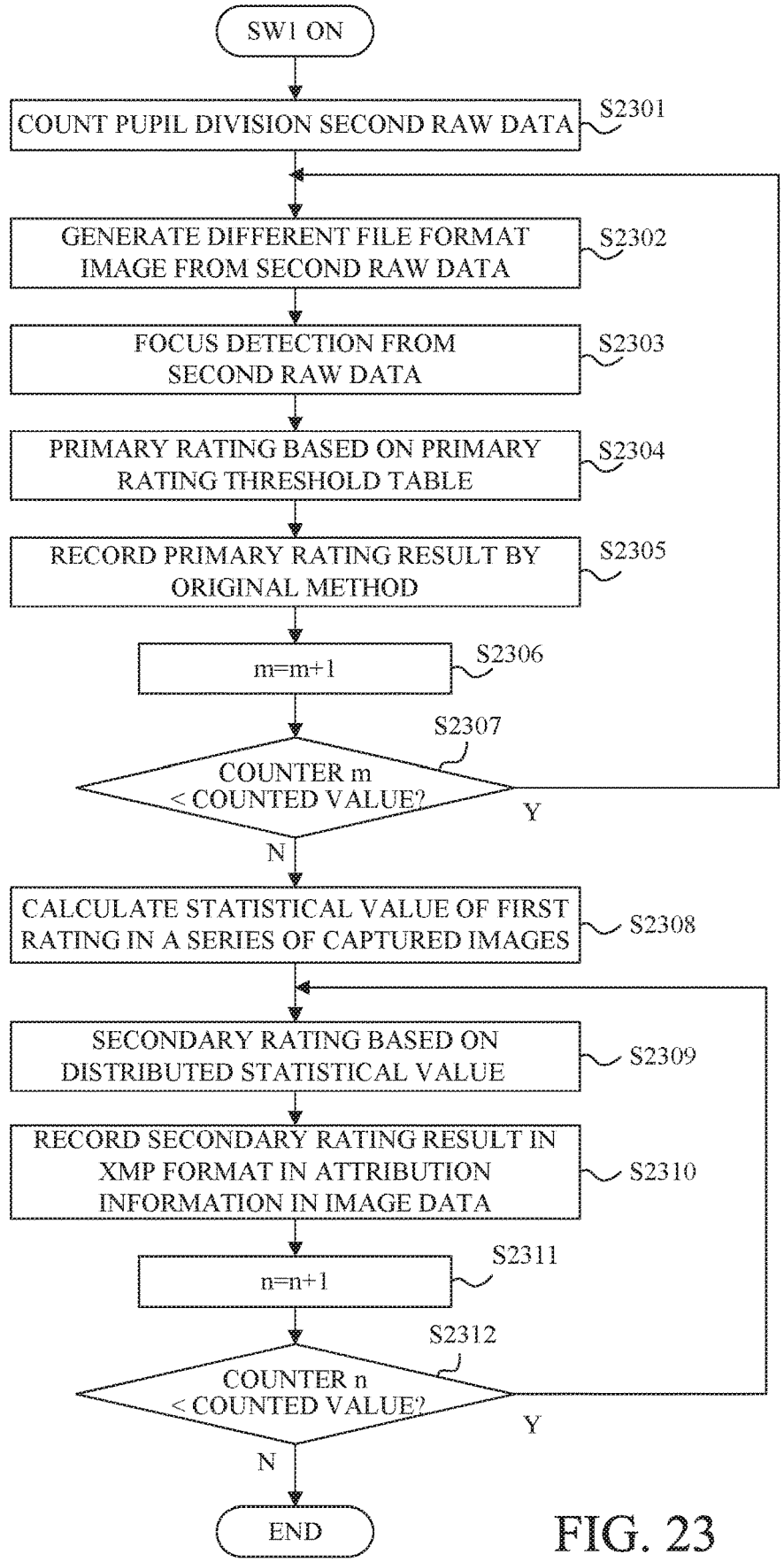
FIG. 23 is a flowchart of processing executed by a computer according to the fifth embodiment.

A flowchart of FIG. 23 illustrates processing (rating operation) executed by the system controller 2210 according to this embodiment. The system controller 2210 reads out of the nonvolatile memory 2214 and executes this processing in accordance with the computer program developed in the system memory 2216. The computer 2200 and the digital camera are electrically connected to each other and can communicate with each other, and the computer 2200 can read various data recorded in the recorder 219 in the digital camera. The system controller 2210 serves as the first evaluator, the second evaluator, and the recorder.

First, in response to an operation instructed by the user to start the image rating, the system controller 2210 proceeds to the step S2301. In the step S2301, the system controller 2210 reads out all links for the second RAW data of the image data designated by the user operation, and temporarily stores them in the image memory 2203 in the computer 2200. The system controller 2210 counts the number of second RAW data temporarily stored in the recorder 219. Hence, the system controller 2210 proceeds to the step S2302.

In the step S2302, the system controller 2210 reads out of the recorder 219 one second RAW data corresponding to the link (referred to as second RAW data of interest hereinafter) among one or more second RAW data temporarily stored in the recorder 219. Then, the system controller 2210 performs various image processing for the second RAW data of interest and generates still image data in a predetermined file format. Thereafter, the system controller 2210 proceeds to the step S2303.

In the step S2303, the system controller 2210 performs a focus detection using the second RAW data of interest. More specifically, the system controller 2210 reads out two image signals, the F-number at the recording time, the reference focus driving amount, and the variation magnification included in the second RAW data of interest. Then, the system controller 2210 extracts the image area corresponding to the focus detecting area from the second RAW data of interest, and calculates the correlation value for each shift amount between the two image signals in the extracted image area. The system controller 2210 specifies the correlation value indicating the highest correlation among the calculated correlation values and calculates the phase difference from the shift amount between the two image signals giving the correlation values.

The system controller 2210 calculates the phase difference and then calculates the defocus amount based on the phase difference, the F-number, and the reference defocus amount. Thereafter, the system controller 2210 proceeds to the step S2304.

In the step S2304, the system controller 2210 performs the primary rating based on the calculated defocus amount. The primary rating in this step is the same as the primary rating described in the step S902 in FIG. 9, and determines the rating by comparing the absolute value of the defocus amount and the in-focus level J with each other. Thereafter, the system controller 2210 proceeds to the step S2305.

In the step S2305, the system controller 2210 records the primary rating result in the attribute information area in the corresponding image data. More specifically, as described in FIG. 7, an information describing area in the Exif method is created in the marker segment "APP1" in the image data, and a "MakerNote" field is provided. Ten ratings with values 1 to 9 based on the focus level J illustrated in FIG. 10 are recorded in the field. This rating recording system can record the ratings more than those in the rating based on the XMP format described in Literature 2, although the compatibility with other manufacturers is low. Thereafter, the system controller 2210 proceeds to the step S2306.

In the step S2306, the system controller 2210 adds the value 1 to the counter m in the second RAW data for which the focus detection is completed. Thereafter, the system controller 2210 proceeds to the step S2307.

In the step S2307, the system controller 2210 compares the value of the counter m in the second RAW data for which the focus detection is completed with the counted value of the second RAW data counted in the step S2301. If the value of the counter m is smaller than the counted value, the system controller 2210 returns to the step S2302 in order to perform the image processing and focus detection for the second RAW data of interest. Then, the operations from the step S2302 to the step S2306 are performed for all the second RAW data that are temporarily stored. If the value of the counter m reaches the measured value, since the system controller 2210 has already read out all the second RAW data of interest stored in the recorder 219, the system controller 2210 proceeds to the step S2308.

In the step S2308, the system controller 2210 analyzes the rating distribution from the primary rating result corresponding to all the second RAW data of interest, and calculates the center value or the center of gravity value as the statistical values in the distribution. Thereafter, the system controller 2210 proceeds to the step S2309.

In the step S2309, when the primary rating result is included in the six ratings of the values 0 to 5 failing within the XMP profile, the system controller 2210 determines which one of the center value and the center of gravity value of the distribution has a smaller rating bias. The rating bias is as described in the step S1102 with reference to FIG. 11, and the system controller 2210 determines which of the center value and the center of gravity value has a lower maximum value of the distribution number for each rating. The rating values 1 to 5 are used to set five segment ranges based on the rating of the XMP profile highly compatible with other devices, except for the value 0 as the initial value that means that no rating is performed. Thereafter, the system controller 2210 proceeds to the step S2310.

In the step S2310, the system controller 2210 records the secondary rating result corresponding to the five segment ranges of the in-focus level in the attribute area in the corresponding image data. The specific recording operation is as described with reference to FIG. 7 in the first embodiment. This rating recording method can record the rating result that maintains the high compatibility with other manufacturers, and prevents the rating bias. Thereafter, the system controller 2210 proceeds to the step S2312.

In the step S2311, the system controller 2210 adds the value 1 to the counter n of the second RAW data for which focus detection has been completed. Thereafter, the system controller 2210 proceeds to the step S2312.

In the step S2312, the system controller 2210 compares the value of the counter n of the second RAW data for which the focus detection has been completed with the counted value of the second RAW data counted in the step S2301. If the value of the counter n is smaller than the counted value, the system controller 2210 returns to the step S2309 in order to perform the secondary rating for the second RAW data of interest. Then, the operations from the step S2309 to the step S2311 are performed for all the second RAW data temporarily stored. If the value of the counter n is equal to or larger than the measured value, the system controller 2210 ends this processing since it finishes the secondary rating of all the second RAW data of interest stored in the recording unit 219.

This embodiment performs the second focus detection in an external device different from the digital camera, and the rating based on the result of the second focus detection. This rating processing in an external device instead of the digital camera can reduce the processing load of the digital camera during imaging. Furthermore, the user can rate the still image data while reducing the bias as low as possible based on the rating result by the external device, and classify the images according to the rating based on the focus state (defocus amount) of the image data obtained by actual imaging. Thereby, it is possible to reduce the load on the user who classifies the image data obtained by imaging.

Sixth Embodiment

As illustrated in FIG. 13, the second embodiment performs the primary rating with a large number of ratings, and the secondary rating based on the center value and the center of gravity value in the distribution of the primary rating. On the other hand, the sixth embodiment according to the present invention directly performs the secondary rating based on the selection status of the rating mode and the in-focus level J that can select the range of the in-focus level for which the secondary rating is previously performed.

Figure 24:
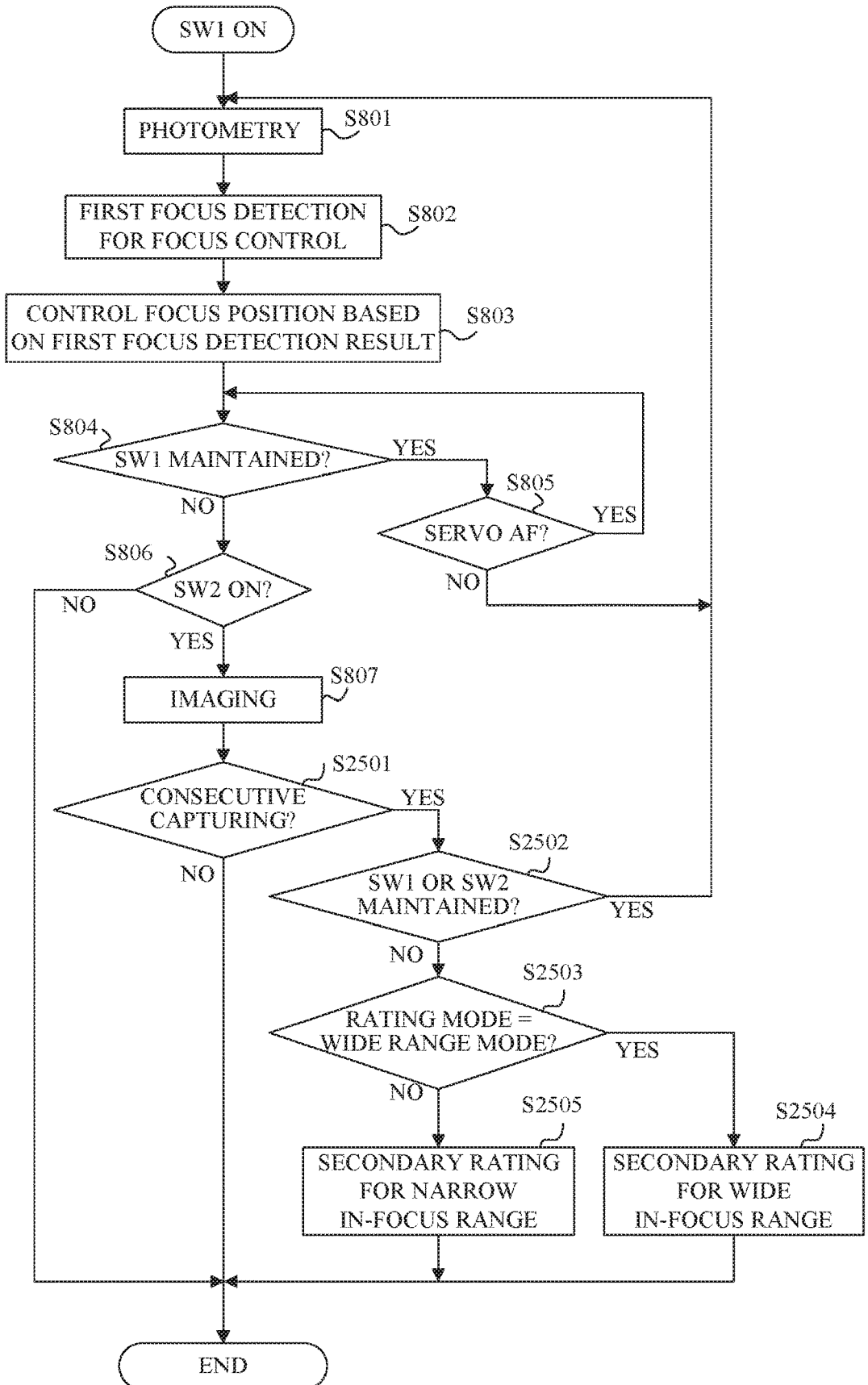
FIG. 24 is a flowchart of processing executed by a digital camera according to a sixth embodiment.

The sixth embodiment will be described with reference to a flowchart illustrated in FIG. 24 and a diagram showing a relationship between the absolute value of the defocus amount and the rating in the secondary rating processing illustrated in FIG. 25. The difference between this embodiment and the second embodiment will be described, and the common description will be omitted.

The digital camera according to this embodiment has a narrow range mode and a wide range mode as a rating mode as illustrated in the setting example of the rating mode in FIG. 14 explained in the second embodiment. The difference between this embodiment and the second embodiment in the rating mode is that after the in-focus level of the image obtained by imaging is calculated in the same manner as the operation of the second embodiment, the secondary rating is directly performed from the in-focus level by addressing the distribution (in-focus level range) of the narrow defocus amount range close to the in-focus state.

The rating operation performed by the digital camera according to this embodiment is set to the still-image single-capturing mode or the still-image consecutive-capturing mode in the mirror down state in the initial state just after the power is turned on while the user views the object image through the viewfinder 206. Now assume that the user previously selects either the narrow range mode or the wide range mode through the user operation.

Initially, in response to the ON operation of the SW1 in the operation switch 211 by the user, the camera controller 212 performs the operations of the steps S801 to S807 described with reference to FIG. 8. After the imaging operation is performed in the step S807, the camera controller 212 proceeds to the step S2501.

In the step S2501, the camera controller 212 determines whether the imaging operation mode is the still-image consecutive-capturing mode. If the imaging operation mode is the still-image consecutive-capturing mode, the camera controller 212 proceeds to the step S2502 to determine the next operation during the consecutive capturing period, and if it is another imaging operation mode, the camera controller 212 ends this processing because the image data obtained by imaging has properly been classified and recorded, In the step S2502, the camera controller 212 determines whether the ON operation of the SW2 in the operation switch 211 is continuing (continuation of the consecutive capturing is instructed) or the SW1 in the operation switch 211 is newly turned on to perform the focus position control. The camera controller 212 returns to the step S801 when the SW2 or the SW1 is turned on. Thereby, the camera controller 212 shifts the main mirror 201 and the sub mirror 202 to the mirror down state, and performs the photometry and first AF. The camera controller 212 proceeds to the step S2503 if neither the SW2 nor the SW1 is turned on. The operation of this step means that the rating according to the present invention is performed for a plurality of images captured in the consecutive capturing period from when the press of the SW1 starts to when the press of the operation switch 211 is released.

In the step S2503, the camera controller 212 determines the selected rating mode, proceeds to the step S2504 if the wide range mode is selected, and proceeds to the step S2505 if the narrow range mode is selected.

In the step S2504, the camera controller 212 sets the threshold for segmenting the in-focus level J [Fδ] to 0.25 [Fδ], and creates totally five segments ranges using a threshold value for a boundary so that the determination result of the in-focus level J corresponds to the wide range mode. Then, the secondary rating is directly performed from the in-focus level J for each of the five segment ranges. The distribution of the in-focus level located outside the defocus region of interest in the wide range mode is included in the closest segment range of the in-focus level J. The camera controller 212 which has completed the secondary rating ends this processing according to this embodiment.

In the step S2505, the camera controller 212 sets the threshold value for segmenting the in-focus level J [Fδ] to 0.25 [Fδ], and creates totally five segments ranges using a threshold value for a boundary so that the determination result of the in-focus level J corresponds to the narrow range mode. Then, the secondary rating is directly performed for each of the five segment ranges without performing the primary rating. The distribution of the in-focus level located outside the defocus region of interest in the narrow range mode is included in the closest segment range of the in-focus level J. The secondary rating operation in this embodiment will be described later with reference to FIG. 25. The camera controller 212 which has completed the secondary rating ends this processing according to this embodiment.

FIG. 25 illustrates the relationship between the absolute value of the defocus amount and the rating in the secondary rating processing. The top row in FIG. shows the in-focus level J [Fδ] segmented for each threshold value of 0.25 [Fδ]. The second row shows an example showing the number of distributions of the image for each segment range of the segmented in-focus level J [Fδ]. The third row shows a rating example when the rating mode is selected as the narrow range mode. When the in-focus level J is J<−1.25 or 1.25<J [Fδ], 1 of the lowest rating excluding the unrated rating 0 is provided. The narrow range mode according to this embodiment assumes the high-resolution gravure printing output, and narrowly sets the in-focus level J to which the highest rating of 5 is provided. The fourth row shows a rating example when the rating mode is selected as the wide range mode. When the in-focus level J is −1.00≤J≤1.00 [Fδ], the highest rating of 5 is provided. The wide range mode in this embodiment assumes the coarse halftone dot printing output such as newspaper, the in-focus level J to which the highest rating of 5 is provided is set widely, and a higher rating is provided than that in the narrow range mode in a range of −1.75≤J<−0.75 or 0.75<J≤1.75 [Fδ], The fifth row in FIG. 25 shows an example of the number of distributions for each rating of the secondary rating in the narrow range mode based on the number of distributions for each segment range of the in-focus level J. Similarly, the sixth row shows an example of the number of distributions for each rating of the secondary rating in the wide range mode. As illustrated in FIG. 25, the secondary rating in the step S2504 or S2505 is directly performed based on the in-focus level of a predetermined focus detecting area in the captured image and its segment range, without converting them into other values.

The secondary rating result may be substituted as the primary rating for the step S2504 or S2505.

This embodiment can perform the rating based on the characteristic of the image output destination, such as the image output resolution, more simply and quickly than the operation of the second embodiment, and the user can reproduce and view the image in descending order of the in-focus level of interest.

Variation

<Scope of Consecutively Captured Images to be Rated>

The first to fourth and sixth embodiments perform the rating according to the present invention for a plurality of image data (simply referred to as images hereinafter) captured in the consecutive capturing period from when the press of the SW1 starts to when the press of the operation switch 211 is released. However, the present invention is not limited to this embodiment, and may store each imaging time or imaging time intervals between two temporally adjacent images. Regardless of the pressed state of the SW1 or the SW2 in the operation switch 211, images captured at time intervals shorter than a predetermined threshold may be handled as a group and receive the rating according to the present invention. This operation can record the rating result which is unlikely to cause the rating bias while maintaining the integration of the original consecutively captured images and the high compatibility with other manufacturers.

A plurality of captures from when the power is turned on to when the power is turned off may be treated as a group, or a plurality of images recorded in the same folder may be treated as a group when the recording destination folder is switched. Then, instead of intentionally interlocking with the operation of the SW1 or the SW2 in the operation switch 211, the rating group may be manually controlled according to another operation input different from the operation input directed to imaging such as the power operation of the operator or the selection of the recording destination folder.

<Example of Specifying Main Object>

Figure 21:
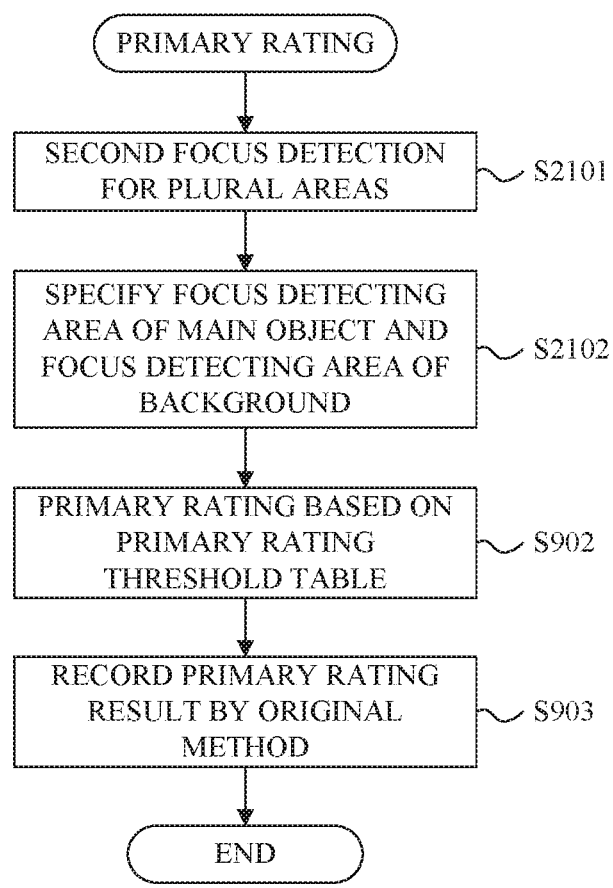
FIG. 21 is a flowchart of primary rating processing executed by the digital camera according to the fourth embodiment.

The fourth embodiment discusses the method of specifying the main object focus detecting area in the step S2102 in FIG. 21 by setting the focus detecting area closest to the near side to the main object focus detecting area. For example, an unillustrated face detector for detecting the face of a person may be provided so that either the entire face or one of the left and right eyes among them may be specified as the main object based on the index such as the largest face size. Alternatively, for example, an unillustrated color detector for detecting the color in the image may be provided, and the main object focus detecting area may be specified based on indices such as color and hue designated by user operation.

<Target Image for which Rating Distribution is Analyzed>

Figure 11:
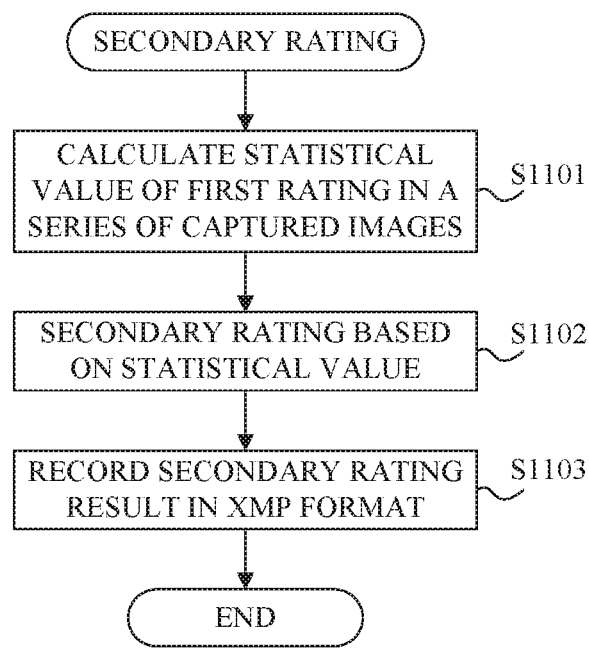
FIG. 11 is a flowchart of secondary rating processing according to the first embodiment.

The first embodiment discusses the step S1101 in FIG. 11, which analyzes the distribution of the primary rating result, and changes the secondary rating based on one of the center value and the center of gravity value as the statistical value in the distribution. According to the first embodiment, a group of captured images to be analyzed for the distribution includes a plurality of still images obtained by consecutive capturing at a predetermined rime interval (time period) during the ON operation of the SW2, and a plurality of motion images (a plurality of frame image data) obtained by consecutive capturing of one scene from the recording start to the stop.

However, the primary and secondary ratings may be performed for a group of captured images (a plurality of image data) obtained by imaging while the optical characteristic of the imaging optical system changes. For example, the primary and secondary ratings may be performed for an image obtained by imaging at a focus position in a predetermined range while the focal position is moved by the focus position control, and a group of images obtained with the same F-number while the F-number of the aperture 102 changes. In this case, since images obtained by imaging with different optical characteristics are not included, the bias of the distribution of the in-focus levels can be reduced and the images can be properly classified.

<Modification Relating to Processing in Mirror-Up>

The still-image single-capturing mode and the still-image consecutive-capturing mode described in each of the above embodiments relate to a modes (first mode) in which the first focus detection is performed in the mirror-down state. However, there may be a mode (second mode) in which the first focus detection is performed in the mirror-up state. The live-view mode and the motion-image capturing mode are different from the still-image single-capturing mode and the still-image consecutive-capturing mode in that the first focus detection is performed in the mirror-up state so that the main mirror 201 and the sub mirror 202 are controlled to provide the mirror-up state.

When the live-view mode is set by the user operation on the operation unit 218, the main mirror 201 and the sub mirror 202 are controlled to provide the mirror-up state. In the live-view mode, the image capturer 210 consecutively captures images at a predetermined cycle such as 60 captures per second, and an image is displayed on the display unit 217 using the obtained image signal.

When the SW1 in the operation switch 211 is turned on in the live-view mode, the first photometry operation measures the luminance of the object image with the image signal of the image capturer 210. Based on the photometric result obtained by the first photometry operation, the aperture diameter of the aperture stop 102, the charge accumulation time of the image capturer 210, and the ISO speed are controlled. The first focus detection follows the first photometric operation and uses the two image signals from the image capturer 10, and the focus position control of the imaging optical system is performed based on the first focus detection result.

When the SW2 is turned on in the live-view mode, the image capturer 210 performs the imaging operation for recording, and the image capturer 210 generates the first RAW data as the pupil division image data from the image signal. Then, the second RAW data for recording is obtained by converting the first RAW data into a predetermined RAW file format, and recorded in the recorder 219. The second RAW data includes the pupil division image data.

A pair of pixel signals obtained by pupil division are added to the first RAW data, and receive predetermined image processing to provide still image data, which is recorded in the recorder 219. The first RAW data is transferred to the memory 213 and used for the second focus detection based on the pupil division image data. The second photometric operation measures the luminance of the object image with the image signal from the image capturer 210. The aperture diameter of the aperture stop 102, the charge accumulation time and the ISO speed of the image capturer 210 are controlled based on the result of the second photometry operation.

When the motion image recording mode is set by the user operation on the operation unit 218, the main mirror 201 and the sub mirror 202 are controlled to provide the mirror-up state. In the motion image recording mode, the image capturer 210 consecutively captures images at a predetermined cycle, such as 60 captures per second, and displays the images on the display unit 217 by using the obtained image capturing signal.

In the motion image recording mode, in response to the user operation instructing the operation unit 218 to start the motion image recording, the image capturer 210 generates the first RAW data as the pupil division image data from the captured image. A pair of pixel signals obtained by the pupil division are added to the first RAW data, and receive the predetermined image processing to provide the motion image data recorded in the recorder 219. The generated first RAW data is transferred to the memory 213 and used for first focus detection based on the pupil division image data. The second photometric operation measures the luminance of the object image with the image signal of the image capturer 210. The aperture diameter of the aperture stop 102 and the charge accumulation time and ISO speed of the image capturer 210 are controlled based on the photometric result obtained by the second photometric operation.

In the still-image single-capturing mode and the still-image consecutive-capturing mode, the first focus detection determines the target focus position of the focus position control with the focus detecting unit 209 in the mirror-down state. On the other hand, the live-view mode performs the first focus detection with the image signal in the mirror-up state, and determines the target focus position of the focus position control based on the first focus detection result. In this case, the focus position of the object image recorded in the above second RAW data or still image data is detected with the image signal obtained in the last imaging operation, and the lens unit portion 100 (imaging optical system) is the controlled at focus position based on the result.

Each of the above embodiments performs the first photometric operation that determines the charge accumulation time and the ISO speed in the imaging operation using the photometric sensor 208 in the mirror-down state. On the other hand, the live-view mode performs the first photometry operation using the image signal in the mirror-up state, and determines the charge accumulation time and the ISO speed of the imaging operation based on the result. In this case, the exposure amount of the object image recorded in the second RAW data or still image data means the exposure amount based on the photometric result using the image signal obtained in the last imaging operation.

In the live-view mode, tracking of the focal position is calculated while the imaging signal is temporarily stored in the memory 213 using the imaging signal in the mirror up state. Then, based on the tracking result, the focus detecting area closest to the object moving destination among the plurality of focus detecting areas 1902 is finally selected as the focus detecting area for the focus detection.

<Modification of Fifth Embodiment>

The fifth embodiment electrically and communicatively connects the recorder 219 in the digital camera with the computer 2200 as an external device. However, a reader configured to read data from the recorder 219 in the digital camera and the external computer may be electrically and communicatively connected to each other. Alternatively, each of the recorder 219 in the digital camera, the reader configured to read data from the recorder 219, and the external computer may include a radio communication unit to establish communications without an electric (wired) connection. This configuration can also provide the same effect as that of the third embodiment.

Each of the above embodiments can more properly evaluate the focus state by evaluating the focus states of a plurality of image data acquired by continuous imaging under two different evaluation conditions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2018-81062, filed on Apr. 20, 2018 and 2019-075241, filed on Apr. 11, 2019 which are hereby incorporated by reference herein in their entirety.

What is claimed is:

1. An image processing apparatus comprising:
at least one memory configured to store instructions; and
at least one processor communicatively connected to the at least one memory and configured to execute the stored instructions to function as:
a first evaluator configured to evaluate a focus state of image data under a first evaluation condition by which the focus state of the image data is evaluated into one of a first number of levels;
a second evaluator configured to evaluate the focus state of the image data under a second evaluation condition by which the focus state of the image data is evaluated into one of a second number of levels, the second number being smaller than the first number, the second number indicating plural numbers; and
a recorder configured to record first evaluation information indicating an evaluation result under the first evaluation condition and second evaluation information indicating an evaluation result under the second evaluation condition.

2. The image processing apparatus according to claim 1, wherein the second evaluator variably sets the second evaluation condition.

3. The image processing apparatus according to claim 2, wherein the second evaluator sets the second evaluation condition using the evaluation result under the first evaluation condition.

4. The image processing apparatus according to claim 3, wherein the second evaluator sets the second evaluation condition using a statistical value of the evaluation result under the first evaluation condition.

5. The image processing apparatus according to claim 2, wherein the second evaluator variably sets a range of an evaluation level in the second evaluation condition in part of a range of an evaluation level in the first evaluation condition.

6. The image processing apparatus according to claim 1, wherein the recorder records the first evaluation information by a first recording method and the second evaluation information by a second recording method different from the first recording method.

7. The image processing apparatus according to claim 6, wherein the second recording method is more compatible than the first recording method.

8. The image processing apparatus according to claim 7, wherein the second recording method is configured to record the second evaluation information in one APP1 region in a marker segment in a JPEG format, in a text format of an XML, method in an Adobe XMP standard, and the first recording method is configured to record the first evaluation information in another APP1 region in a format different from the text format of the XML method.

9. The image processing apparatus according to claim 1, wherein the second evaluator performs an evaluation under the second evaluation condition at a predetermined time period in which a plurality of image data by motion image capturing is acquired.

10. The image processing apparatus according to claim 1, wherein the first evaluator and the second evaluator evaluates plurality of image data acquired while a focus position of an imaging optical system continuously moves in consecutive capturing.

11. The image processing apparatus according to claim 1, wherein the first evaluator and the second evaluator evaluates plurality of image data acquired through an imaging optical system having the same F-number in consecutive capturing.

12. The image processing apparatus according to claim 2, wherein a focus state is detected by a phase difference detection method, and
wherein the second evaluator changes the second evaluation condition according to an index relating to either characteristics of the pair of phase difference image signals used in the phase difference detection method in consecutive capturing or a correlation value between the pair of phase difference image signals.

13. The image processing apparatus according to claim 2, wherein a focus state is detected for each of a main object and a background, and wherein the second evaluator changes the second evaluation condition according to a difference between the focus state of the main object and the focus state of the background.

14. An imaging apparatus comprising:
an image sensor configured to provide continuous capturing; and
an image processing apparatus,
wherein the image processing apparatus includes:
a first evaluator configured to evaluate a focus state of image data under a first evaluation condition by which the focus state of the image data is evaluated into one of a first number of levels;
a second evaluator configured to evaluate the focus state of the image data under a second evaluation condition by which the focus state of the image data is evaluated into one of a second number of levels, the second number being smaller than the first number, the second number indicating plural numbers; and
a recorder configured to record first evaluation information indicating an evaluation result under the first evaluation condition and second evaluation information indicating an evaluation result under the second evaluation condition.

15. An image processing method comprising the steps of:
evaluating a focus state of image data under a first evaluation condition by which the focus state of the image data is evaluated into one of a first number of levels;
evaluating the focus state of the image data under a second evaluation condition by which the focus state of the image data is evaluated into one of a second number of levels, the second number being smaller than the first number, the second number indicating plural numbers; and
recording first evaluation information indicating an evaluation result under the first evaluation condition and second evaluation information indicating an evaluation result under the second evaluation condition.

16. A non-transitory computer-readable storage medium storing a computer program for causing a computer to execute an image processing method,
wherein the image processing method includes the steps of:
evaluating a focus state of image data under a first evaluation condition by which the focus state of the image data is evaluated into one of a first number of levels;
evaluating the focus state of the image data under a second evaluation condition by which the focus state of the image data is evaluated into one of a second number of levels, the second number being smaller than the first number, the second number indicating plural numbers; and
recording first evaluation information indicating an evaluation result under the first evaluation condition and second evaluation information indicating an evaluation result under the second evaluation condition.

* * * * *